(12) United States Patent
Ko et al.

(10) Patent No.: US 8,953,540 B2
(45) Date of Patent: Feb. 10, 2015

(54) METHOD AND APPARATUS FOR EFFICIENT FEEDBACK IN A WIRELESS COMMUNICATION SYSTEM SUPPORTING MULTIPLE ANTENNAS

(75) Inventors: Hyun Soo Ko, Anyang-si (KR); Jae Hoon Chun, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 13/582,014

(22) PCT Filed: Mar. 29, 2011

(86) PCT No.: PCT/KR2011/002151
§ 371 (c)(1),
(2), (4) Date: Aug. 30, 2012

(87) PCT Pub. No.: WO2011/122830
PCT Pub. Date: Oct. 6, 2011

(65) Prior Publication Data
US 2012/0320862 A1    Dec. 20, 2012

Related U.S. Application Data

(60) Provisional application No. 61/318,393, filed on Mar. 29, 2010, provisional application No. 61/334,948, filed on May 14, 2010, provisional application No. 61/372,468, filed on Aug. 11, 2010.

(30) Foreign Application Priority Data

Mar. 29, 2011    (KR) .................. 10-2011-0028306

(51) Int. Cl.
*H04L 29/08*    (2006.01)
*H04B 7/04*    (2006.01)
*H04L 1/00*    (2006.01)
*H04B 7/06*    (2006.01)
*H04W 72/04*    (2009.01)

(52) U.S. Cl.
CPC ............ *H04B 7/0417* (2013.01); *H04L 1/0026* (2013.01); *H04B 7/063* (2013.01); *H04B 7/0632* (2013.01); *H04B 7/0639* (2013.01); *H04W 72/0413* (2013.01)
USPC .......................................... 370/329; 370/341

(58) Field of Classification Search
None
See application file for complete search history.

(56) References Cited

U.S. PATENT DOCUMENTS

2008/0080635 A1    4/2008    Hugl et al.
2008/0132281 A1    6/2008    Kim et al.
(Continued)

*Primary Examiner* — Marcus R Smith
*Assistant Examiner* — Ayanah George
(74) *Attorney, Agent, or Firm* — McKenna Long & Aldridge LLP

(57) ABSTRACT

The present invention relates to a method for transmitting channel state information regarding downlink transmission through an uplink may comprise the steps of: receiving a downlink signal through a downlink channel; generating a rank indicator (RI) for the downlink channel, a first precoding matrix indicator (PMI), and a second PMI, and generating channel quality information (CQI) on the basis of pre-coding information which is determined by a combination of the first and second PMIs; and transmitting the RI, first PMI, second PMI, and/or CQI through the uplink channel. The CQI may comprises a first type of CQI calculated on the basis of the number N of layers in which the downlink signal is received and/or a second type of CQI calculated on the basis of the assumption that the number of layers in which the downlink signal is transmitted is K (where K>N).

9 Claims, 23 Drawing Sheets

(56) References Cited

U.S. PATENT DOCUMENTS

2009/0034639 A1 2/2009 Hwang et al.
2009/0052405 A1* 2/2009 Ko et al. ....................... 370/335
2009/0310698 A1 12/2009 Agarwal et al.
2011/0176629 A1* 7/2011 Bayesteh et al. .............. 375/267
2011/0235620 A1* 9/2011 Ahn et al. ..................... 370/336

* cited by examiner (a)

DL  [ DL CC$_0$ ]  [ DL CC$_1$ ]  $\cdots$  [ DL CC$_{N-2}$ ]  [ DL CC$_{N-1}$ ]

UL  [ UL CC$_0$ ]  [ UL CC$_1$ ]  $\cdots$  [ UL CC$_{M-1}$ ]

(a)

(b)

(c)

(a)

(b)

(a)

(b)

_US 8,953,540 B2_

METHOD AND APPARATUS FOR EFFICIENT FEEDBACK IN A WIRELESS COMMUNICATION SYSTEM SUPPORTING MULTIPLE ANTENNAS

This Application is a 35 U.S.C. §371 National Stage Entry of International Application No. PCT/KR2011/002151, filed Mar. 29, 2011 and claims the benefit of U.S. Provisional Application Nos. 61/318,393, filed Mar. 29, 2010, 61/334,948, filed May 14, 2010, 61/372,468, filed Aug. 11, 2010, and Korean Application No: 10-2011-0028306, filed Mar. 29, 2011, all of which are incorporated by reference in their entirety herein.

TECHNICAL FIELD

The present invention relates to a wireless communication system, and more particularly to a method and apparatus for performing effective feedback in a wireless communication system supporting multiple antennas.

BACKGROUND ART

Generally, Multiple-Input Multiple-Output (MIMO) technology will hereinafter be described in detail. In brief, MIMO is an abbreviation for Multi-Input Multi-Output. MIMO technology uses multiple transmission (Tx) antennas and multiple reception (Rx) antennas to improve the efficiency of transmission/reception (Tx/Rx), whereas the conventional art generally uses a single transmission (Tx) antenna and a single reception (Rx) antenna. In other words, MIMO technology allows a transmitting end and a receiving end to use multiple antennas so as to increase capacity or improve performance. If necessary, MIMO technology may also be called multi-antenna technology. In order to correctly perform multi-antenna transmission, the MIMO system has to receive feedback information regarding channels from a receiving end designed to receive multi-antenna channels.

Various feedback information fed back from the receiving end to the transmitting end in the legacy MIMO wireless communication system may be defined, for example, a rank indicator (RI), a precoding matrix index (PMI), channel quality information (CQI), etc. Such feedback information may be configured as information appropriate for legacy MIMO transmission.

There is a need for a new system including the extended antenna configuration as compared to the legacy MIMO wireless communication system to be developed and introduced to the market. For example, although the legacy system can support a maximum of 4 transmission antennas, new systems have an extended antenna configuration that supports MIMO transmission based on 8 transmission antennas, resulting in increased system capacity.

DISCLOSURE

Technical Problem

Since MIMO transmission is more complicated than conventional MIMO transmission in a new system supporting an extended antenna configuration, the new system cannot support the MIMO operation reliably with feedback information defined for the conventional MIMO transmission.

An object of the present invention devised to solve the conventional problem is to provide a method and apparatus for configuring and transmitting feedback information to reliably and efficiently support a MIMO operation based on an extended antenna configuration.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting channel state information regarding a downlink transmission on uplink in a wireless communication system includes receiving a downlink signal on a downlink channel, generating a rank indicator (RI), a first precoding matrix index (PMI), and a second PMI for the downlink channel and generating a channel quality indicator (CQI) based on precoding information determined by a combination of the first and second PMIs, and transmitting at least one of the RI, the first PMI, the second PMI, and the CQI on an uplink channel. The CQI includes at least one of a first-type CQI calculated based on the number N of layers in which the downlink signal is received and a second-type CQI calculated based on the number K of layers in which the downlink signal is transmitted (K>N).

In another aspect of the present invention, a method for receiving channel state information regarding a downlink transmission on uplink in a wireless communication system includes transmitting a downlink signal on a downlink channel, and receiving on an uplink channel an RI, a first PMI, and a second PMI for the downlink channel, and a CQI generated based on precoding information determined by a combination of the first and second PMIs. The CQI includes at least one of a first-type CQI calculated based on the number N of layers in which the downlink signal is received and a second-type CQI calculated based on the number K of layers in which the downlink signal is transmitted (K>N).

In another aspect of the present invention, a user equipment for transmitting channel state information regarding a downlink transmission on uplink in a wireless communication system includes a reception module for receiving a downlink signal from a base station, a transmission module for transmitting an uplink signal to the base station, and a processor for controlling the user equipment including the reception module and the transmission module. The processor is configured to receive a downlink signal on a downlink channel through the reception module, generate an RI, a first PMI, and a second PMI for the downlink channel for the downlink channel, generate a CQI based on precoding information determined by a combination of the first and second PMIs, and transmit at least one of the RI, the first PMI, the second PMI, and the CQI on an uplink channel through the transmission module. The CQI includes at least one of a first-type CQI calculated based on the number N of layers in which the downlink signal is received and a second-type CQI calculated based on the number K of layers in which the downlink signal is transmitted (K>N).

In a further aspect of the present invention, a base station for receiving channel state information regarding a downlink transmission on uplink in a wireless communication system includes a transmission module for transmitting a downlink signal to a user equipment, a reception module for receiving an uplink signal from the user equipment, and a processor for controlling the base station including the transmission module and the reception module. The processor is configured to transmit a downlink signal on a downlink channel through the transmission module, and receive on an uplink channel an RI, a first PMI, and a second PMI for the downlink channel, and a CQI generated based on precoding information determined by a combination of the first and second PMIs through the reception module. The CQI includes at least one of a first-type CQI calculated based on the number N of layers in which the downlink signal is received and a second-type CQI calculated based on the number K of layers in which the downlink signal is transmitted (K>N).

Advantageous Effects

According to the present invention, a method and apparatus for configuring and transmitting feedback information to reliably and efficiently support a MIMO operation based on an extended antenna configuration can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 6 is a conceptual diagram illustrating downlink (DL) and uplink (UL) component carriers (CCs);

BEST MODE FOR CARRYING OUT THE INVENTION

Figure 1:
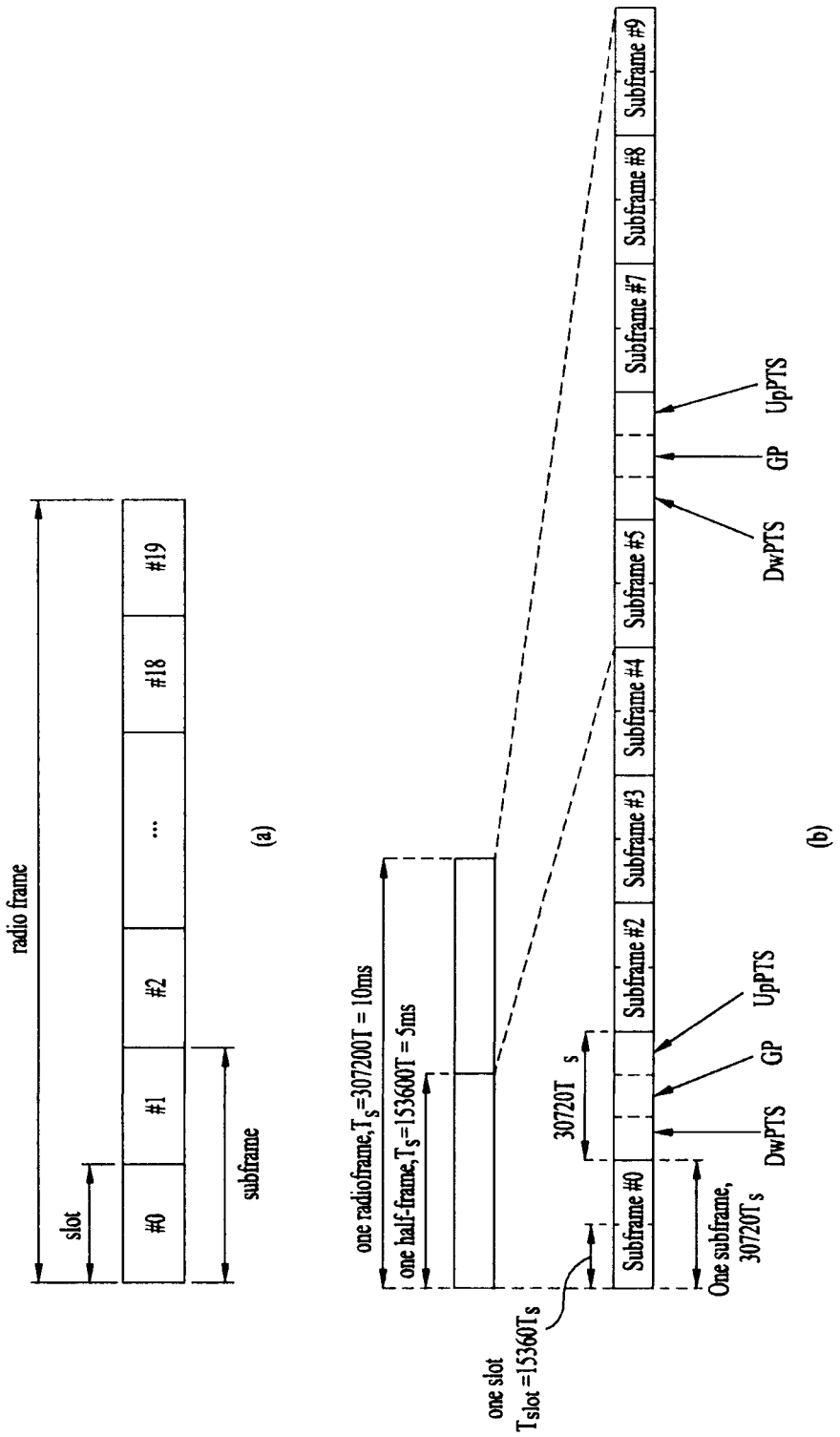
FIG. 1 exemplarily shows a radio frame structure for use in a 3rd Generation Partnership Project Long Term Evolution (3GPP LTE) system.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

FIG. 1 exemplarily shows a radio frame structure for use in a 3rd Generation Partnership Project Long Term Evolution (3GPP LTE) system. A downlink (DL) radio frame structure will hereinafter be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplexing (FDD) and a type 2 radio frame structure applicable to Time Division Duplexing (TDD).

FIG. 1(a) is a diagram showing the structure of the type 1 radio frame. A downlink radio frame includes 10 subframes, and one subframe includes two slots in a time region. A time required for transmitting one subframe is defined in a Transmission Time Interval (TTI). For example, one subframe may have a length of 1 ms and one slot may have a length of 0.5 ms. One slot may include a plurality of OFDM symbols in a time region and include a plurality of Resource Blocks (RBs) in a frequency domain. Since the 3GPP LTE system uses OFDMA in downlink, the OFDM symbol indicates one symbol duration. The OFDM symbol may be called an SC-FDMA symbol or a symbol duration. RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
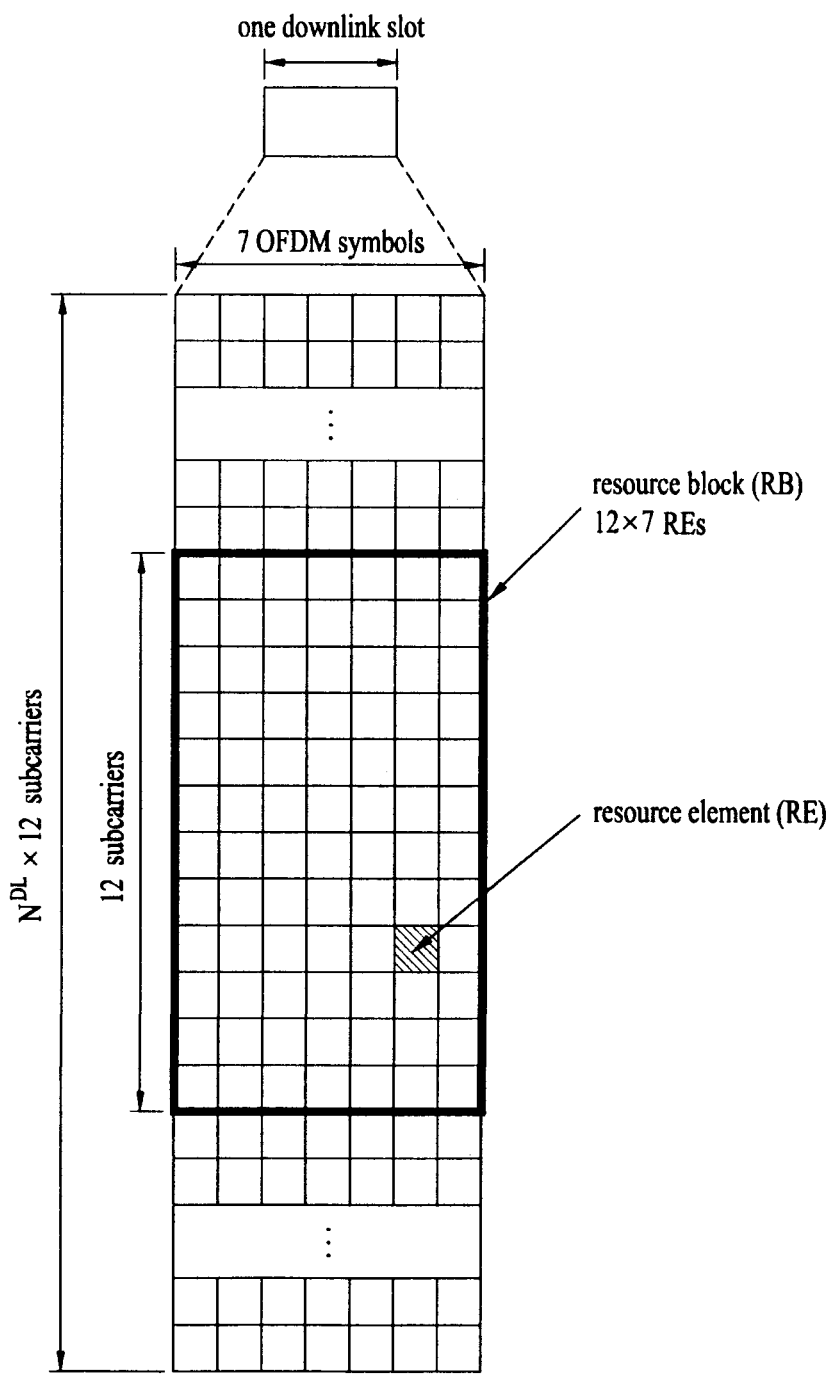
FIG. 2 exemplarily shows a resource grid of a downlink (DL) slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
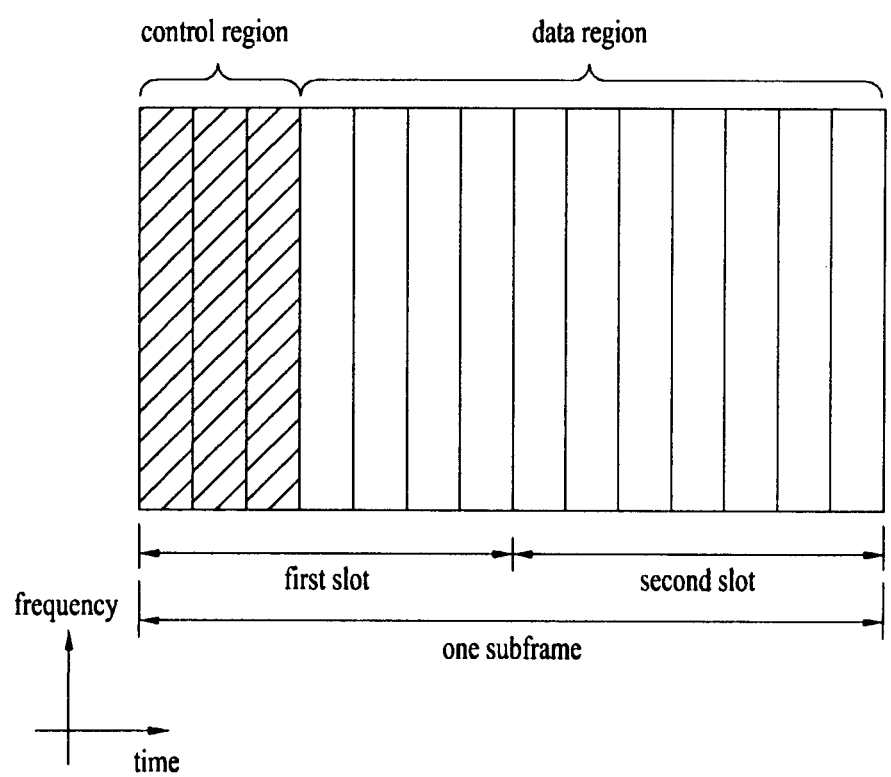
FIG. 3 is a downlink (DL) subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
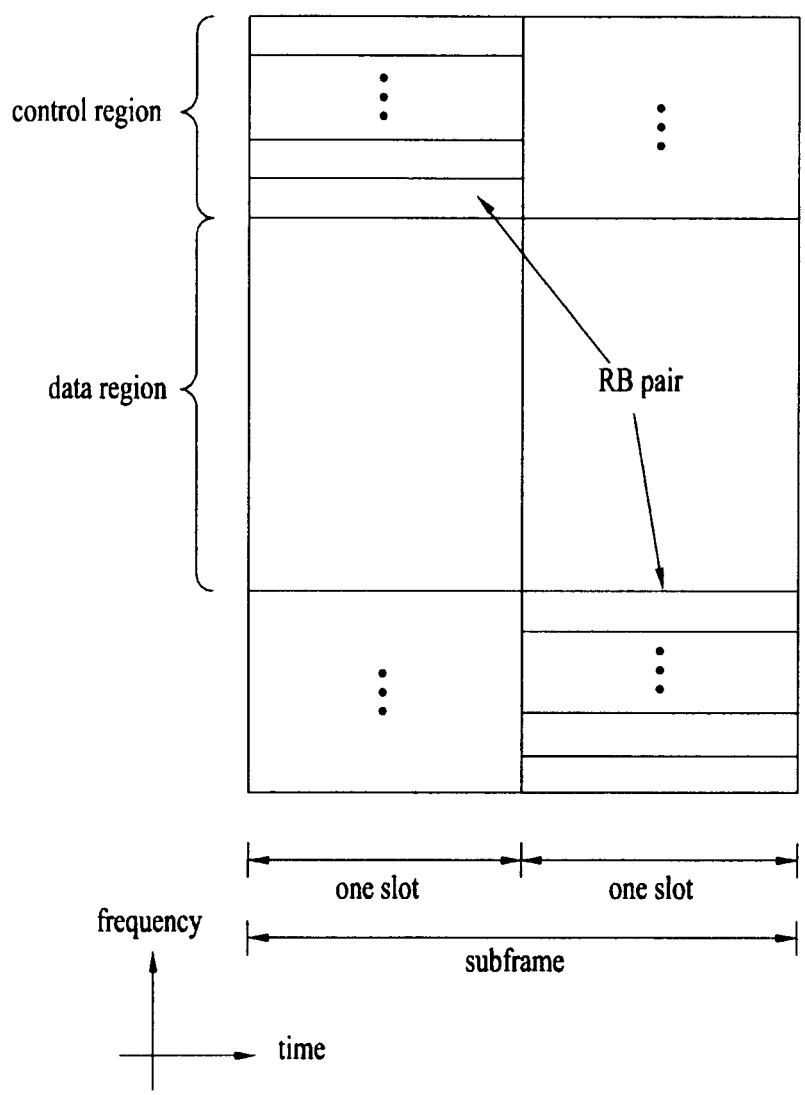
FIG. 4 is an uplink (UL) subframe structure.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Carrier Aggregation

Although downlink and uplink bandwidths are different from each other, a wireless communication system typically uses one carrier. For example, a wireless communication system having one carrier for each of the downlink and the uplink and symmetry between the downlink and uplink bandwidths may be provided based on a single carrier.

The International Telecommunication Union (ITU) requests that IMT-Advanced candidates support wider bandwidths, compared to legacy wireless communication systems. However, allocation of a wide frequency bandwidth is difficult throughout most of the world. Accordingly, a technology for efficiently using small segmented bands, known as carrier aggregation (bandwidth aggregation) or spectrum aggregation, has been developed in order to aggregate a plurality of physical bands to a wider logical band.

Carrier aggregation was introduced to support increased throughput, prevent cost increase caused by introduction of wideband RF devices, and ensure compatibility with legacy systems. Carrier aggregation enables data exchange between a UE and an eNB through a group of carriers each having a bandwidth unit defined in a legacy wireless communication system (e.g. 3GPP LTE Release-8 or Release-9 in case of 3GPP LTE-A). The carriers each having a bandwidth unit defined in the legacy wireless communication system may be called Component Carriers (CCs). Carrier aggregation using one or more CCs may be applied to each of downlink and uplink. Carrier aggregation may support a system bandwidth of up to 100 MHz by aggregating up to five CCs each having a bandwidth of 5, 10 or 20MHz.

A downlink CC and an uplink CC may be represented as a DL CC and a UL CC, respectively. A carrier or CC may be represented as a cell in terms of function in the 3GPP LTE system. Thus, a DL CC and a UL CC may be referred to as a DL cell and a UL cell, respectively. Hereinbelow, the terms 'carriers', 'component carriers', 'CCs' or 'cells' will be used to signify a plurality of carriers to which carrier aggregation is applied.

While the following description exemplarily uses an eNB (BS) or cell as a downlink transmission entity and exemplarily uses a UE as an uplink transmission entity, the scope or spirit of the present invention is not limited thereto. That is, even when a relay node (RN) may be used as a downlink transmission entity from an eNB to a UE and or be used as an uplink reception entity from a UE to an eNB, or even when the RN may be used an uplink transmission entity for a UE or be used as a downlink reception entity from an eNB, it should be noted that the embodiments of the present invention can be applied without difficulty.

Downlink carrier aggregation may be described as an eNB supporting downlink transmission to a UE in frequency resources (subcarriers or physical resource blocks [PRBs]) of one or more carrier bands in time resources (allocated in units of a subframe). Uplink carrier aggregation may be described as a UE supporting uplink transmission to an eNB in frequency resources (subcarriers or PRBs) of one or more carrier bands in time resources (allocated in units of a subframe).

Figure 5:
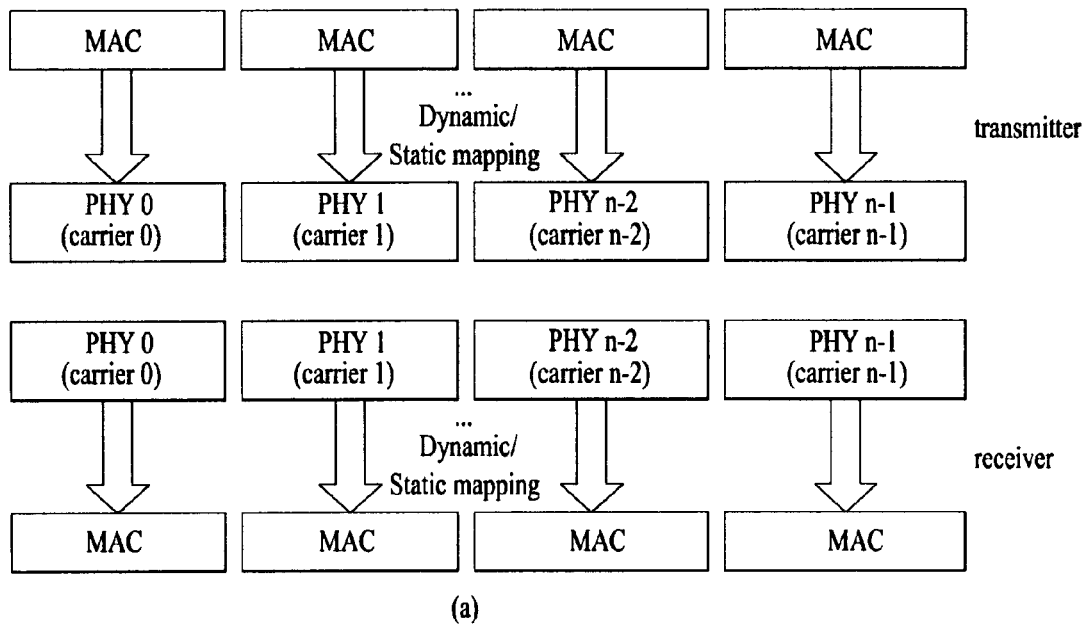
FIG. 5 shows a physical layer (L1) and a MAC layer (L2) of a multi-carrier supported system.
Figure 5:
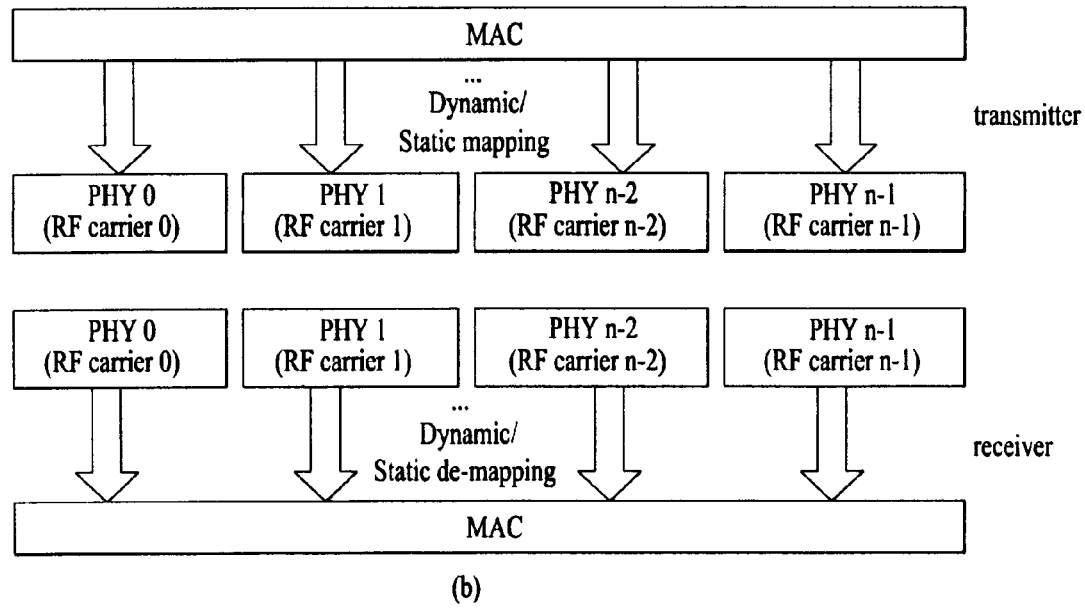

FIG. 5 shows a physical layer (first layer, L1) and a MAC layer (second layer, L2) of a multi-carrier supported system. Referring to FIG. 5, an eNB or BS of the legacy wireless communication system supporting a single carrier includes one physical layer (PHY) entity capable of supporting one carrier, and one medium access control (MAC) entity for controlling one PHY entity may be provided to the eNB. For example, baseband processing may be carried out in the PHY layer. For example, the L1/L2 scheduler operation including not only MAC PDU (Protocol Data Unit) creation of a transmitter but also MAC/RLC sub-layers may be carried out in the MAC layer. The MAC PDU packet block of the MAC layer is converted into a transport block through a logical transport layer, such that the resultant transport block is mapped to a physical layer input information block. In FIG. 5, the MAC layer is represented as the entire L2 layer, and may conceptually cover MAC/RLC/PDCP sub-layers. For convenience of description and better understanding of the present invention, the above-mentioned application may be used interchangeably in the MAC layer description of the present invention.

On the other hand, a multicarrier-supporting system may provide a plurality of MAC-PHY entities. In more detail, as can be seen from FIG. 5(a), the transmitter and receiver of the multicarrier-supporting system may be configured in such a manner that one MAC-PHY entity is mapped to each of n component carriers (n CCs). An independent PHY layer and an independent MAC layer are assigned to each CC, such that a PDSCH for each CC may be created in the range from the MAC PDU to the PHY layer.

Alternatively, the multicarrier-supporting system may provide one common MAC entity and a plurality of PHY entities. That is, as shown in FIG. 5(b), the multicarrier-supporting system may include the transmitter and the receiver in such a manner that n PHY entities respectively correspond to n CCs and one common MAC entity controlling the n PHY entities may be present in each of the transmitter and the receiver. In this case, a MAC PDU from one MAC layer may be branched into a plurality of transport blocks corresponding to a plurality of CCs through a transport layer. Alternatively, when generating a MAC PDU in the MAC layer or when generating an RLC PDU in the RLC layer, the MAC PDU or RLC PDU may be branched into individual CCs. As a result, a PDSCH for each CC may be generated in the PHY layer.

PDCCH for transmitting L1/L2 control signaling control information generated from a packet scheduler of the MAC layer may be mapped to physical resources for each CC, and then transmitted. In this case, PDCCH that includes control information (DL assignment or UL grant) for transmitting PDSCH or PUSCH to a specific UE may be separately encoded at every CC to which the corresponding PDSCH/PUSCH is transmitted. The PDCCH may be called a separate coded PDCCH. On the other hand, PDSCH/PUSCH transmission control information of several CCs may be configured in one PDCCH such that the configured PDCCH may be transmitted. This PDCCH may be called a joint coded PDCCH.

To support carrier aggregation, connection between a BS (or eNB) and a UE (or RN) needs to be established and preparation of connection setup between the BS and the UE is needed in such a manner that a control channel (PDCCH or PUCCH) and/or a shared channel (PDSCH or PUSCH) can be transmitted. In order to perform the above-mentioned connection or connection setup for a specific UE or RN, measurement and/or reporting for each carrier are needed, and CCs serving as the measurement and/or reporting targets may be assigned. In other words, CC assignment means that CCs (indicating the number of CCs and indexes of CCs) used for DL/UL transmission are established in consideration of not only capabilities of a specific UE (or RN) from among UL/DL CCs constructed in the BS but also system environment.

In this case, when CC assignment is controlled in third layer (L3) Radio Resource Management (RRM), UE-specific or RN-specific RRC signaling may be used. Alternatively, cell-specific or cell cluster-specific RRC signaling may be used. Provided that dynamic control such as a series of CC activation/deactivation settings is needed for CC assignment, a predetermined PDCCH may be used for L1/L2 control signaling, or a dedicated physical control channel for CC assignment control information or an L2 MAC-message formatted PDSCH may be used. On the other hand, if CC assignment is controlled by a packet scheduler, a predetermined PDCCH may be used for L1/L2 control signaling, a physical control channel dedicated for CC assignment control information may be used, or a PDSCH configured in the form of an L2 MAC message may be used.

FIG. 6 is a conceptual diagram illustrating downlink (DL) and uplink (UL) component carriers (CCs). Referring to FIG. 6, DL and UL CCs may be assigned from an eNB (cell) or RN. For example, the number of DL CCs may be set to N and the number of UL CCs may be set to M.

Through the UE's initial access or initial deployment process, after RRC connection is established on the basis of one certain CC for DL or UL (cell search) (for example, system information acquisition/reception, initial random access process, etc.), a unique carrier setup for each UE may be provided from a dedicated signaling (UE-specific RRC signaling or UE-specific L1/L2 PDCCH signaling). For example, assuming that a carrier setup for UE is commonly achieved in units of an eNB (cell or cell-cluster), the UE carrier setup may also be provided through cell-specific RRC signaling or cell-specific UE-common L1/L2 PDCCH signaling. In another example, carrier component information for use in an eNB may be signaled to a UE through system information for RRC connection setup, or may also be signaled to additional system information or cell-specific RRC signaling upon completion of the RRC connection setup.

While DL/UL CC setup has been described, centering on the relationship between an eNB and a UE, to which the present invention is not limited, an RN may also provide DL/UL CC setup to a UE contained in an RN region. In addition, in association with an RN contained in an eNB region, the eNB may also provide DL/UL CC setup of the corresponding RN to the RN of the eNB region. For clarity, while the following description will disclose DL/UL CC setup on the basis of the relationship between the eNB and the UE, it should be noted that the same content may also be applied to the relationship between the RN and the UE (i.e., access uplink and downlink) or the relation between the eNB and the RN (backhaul uplink or downlink) without departing from the scope or spirit of the present invention.

When the above-mentioned DL/UL CCs are uniquely assigned to individual UEs, DL/UL CC linkage may be implicitly or explicitly configured through a certain signaling parameter definition.

Figure 7:
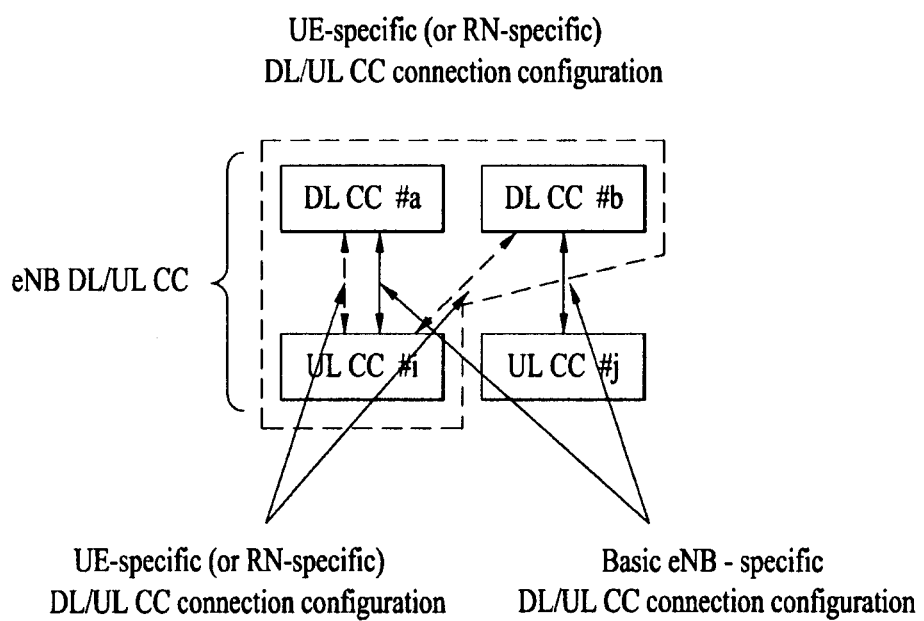
FIG. 7 shows an exemplary linkage of DL/UL CCs.

FIG. 7 shows an exemplary linkage of DL/UL CCs. In more detail, when an eNB configures two DL CCs (DL CC #a and DL CC #b) and two UL CCs (UL CC #i and UL CC #j), FIG. 6 shows a DL/UL CC linkage defined when two DL CCs (DL CC #a and DL CC #b) and one UL CC (UL CC #i) are assigned to a certain UE.

In a DL/UL CC linkage setup shown in FIG. 7, a solid line indicates a linkage setup between DL CC and UL CC that are basically constructed by an eNB, and this linkage setup between DL CC and UL CC may be defined in "System Information Block (SIB) 2". In the DL/UL CC linkage setup shown in FIG. 7, a dotted line indicates a linkage setup between DL CC and UL CC configured in a specific UE. The above-mentioned DL CC and UL CC linkage setup shown in FIG. 7 is disclosed only for illustrative purposes, and the scope or spirit of the present invention is not limited thereto. That is, in accordance with various embodiments of the present invention, the number of DL CCs or UL CCs configured by an eNB may be set to an arbitrary number. Thus, the number of UE-specific DL CCs or the number of UE-specific UL CCs in the above-mentioned DL CCs or UL CCs may be set to an arbitrary number, and associated DL/UL CC linkage may be defined in a different way from that of FIG. 7.

Further, from among DL CCs and UL CCs configured or assigned, a primary CC (PCC), or a primary cell (P-cell) or an anchor CC (also called an anchor cell) may be configured. For example, a DL PCC (or DL P-cell) aiming to transmit configuration/reconfiguration information on RRC connection setup may be configured. In another example, UL CC for transmitting PUCCH to be used when a certain UE transmits UCI that must be transmitted on uplink may be configured as UL PCC (or UL P-cell). For convenience of description, it is assumed that one DL PCC (P-cell) and one UL PCC (P-cell) are basically assigned to each UE. Alternatively, if a large number of CCs is assigned to UE or if CCs can be assigned from a plurality of eNBs, one or more DL PCCs (P-cells)

and/or one or more UL PCCs (P-cells) may be assigned from one or more eNBs to a certain UE. For linkage between DL PCC (P-cell) and UL PCC (P-cell), a UE-specific configuration method may be considered by the eNB as necessary. To implement a more simplified method, a linkage between DL PCC (P-cell) and UL PCC (P-cell) may be configured on the basis of the relationship of basic linkage that has been defined in LTE Release-8 (LTE Rel-8) and signaled to System Information Block (or Base) 2. DL PCC (P-cell) and UL PCC (P-cell) for the above-mentioned linkage configuration are grouped so that the grouped result may be denoted by a UE-specific P-cell.

SC-FDMA Transmission and OFDMA Transmission

Figure 8:
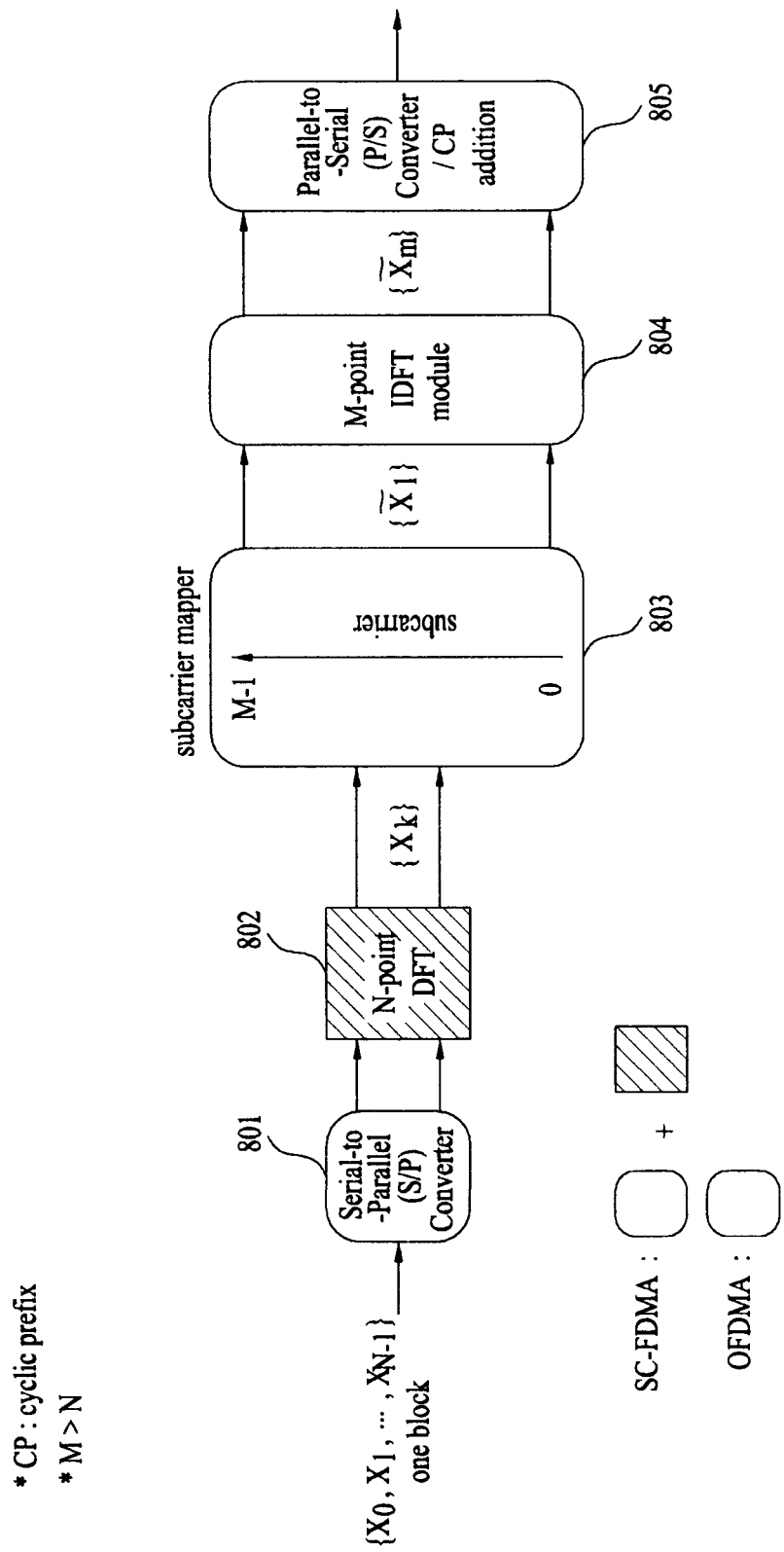
FIG. 8 is a conceptual diagram illustrating an SC-FDMA transmission scheme and an OFDMA transmission scheme.

FIG. 8 is a conceptual diagram illustrating an SC-FDMA transmission scheme and an OFDMA transmission scheme for use in a mobile communication system. The SC-FDMA transmission scheme may be used for UL transmission and the OFDMA transmission scheme may be used for DL transmission.

Each of the UL signal transmission entity (e.g., UE) and the DL signal transmission entity (e.g., eNB) may include a Serial-to-Parallel (S/P) Converter 801, a subcarrier mapper 803, an M-point Inverse Discrete Fourier Transform (IDFT) module 804, and a Parallel-to-Serial Converter 805. Each input signal that is input to the S/P converter 801 may be a channel coded and modulated data symbol. However, a user equipment (UE) for transmitting signals according to the SC-FDMA scheme may further include an N-point Discrete Fourier Transform (DFT) module 802. The influence of IDFT processing of the M-point IDFT module 804 is considerably offset, such that a transmission signal may be designed to have a single carrier property. That is, the DFT module 802 performs DFT spreading of an input data symbol such that a single carrier property requisite for UL transmission may be satisfied. The SC-FDMA transmission scheme basically provides good or superior Peak to Average Power ratio (PAPR) or Cubic Metric (CM), such that the UL transmitter can more effectively transmit data or information even in the case of the power limitation situation, resulting in an increase in user throughput.

Figure 9:
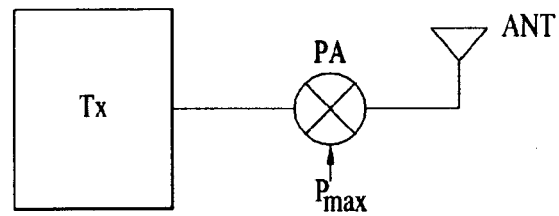
FIG. 9 is a conceptual diagram illustrating maximum transmission power for single antenna transmission and MIMO transmission.
Figure 9:
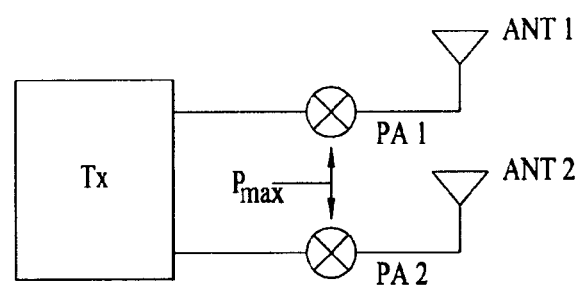
Figure 9:
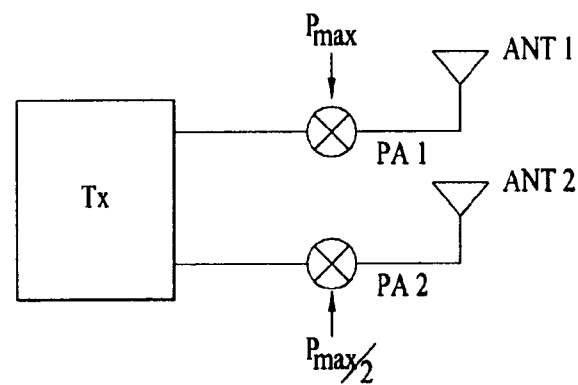

FIG. 9 is a conceptual diagram illustrating maximum transmission power for single antenna transmission and MIMO transmission. FIG. 9(a) shows the case of single antenna transmission. As can be seen from FIG. 9(a), one power amplifier (PA) may be provided to one antenna. In FIG. 9(a), an output signal ($P_{max}$) of the power amplifier (PA) may have a specific value, for example, 23 dBm. In contrast, FIGS. 9(b) and 9(c) show the case of MIMO transmission. As can be seen from FIGS. 9(b) and 9(c), several PAs may be mapped to respective transmission (Tx) antennas. For example, provided that the number of transmission (Tx) antennas is set to 2, 2 PAs may be mapped to respective transmission (Tx) antennas. The setting of output values (i.e., maximum transmission power) of 2 PAs may be configured in different ways as shown in FIGS. 9(b) and 9(c).

In FIG. 9(b), maximum transmission power ($P_{max}$) for single antenna transmission may be divisionally applied to PA1 and PA2. That is, if a transmission power value of x [dBm] is assigned to PA1, a transmission power value of ($P_{max}$−x) [dBm] may be applied to PA2. In this case, since total transmission power ($P_{max}$) is maintained, the transmitter may have higher robustness against the increasing PAPR in the power limitation situation.

On the other hand, as can be seen from FIG. 9(c), only one Tx antenna (ANT1) may have a maximum transmission power value ($P_{max}$), and the other Tx antenna (ANT2) may have a half value ($P_{max}/2$) of the maximum transmission power value ($P_{max}$). In this case, only one transmission antenna may have higher robustness against increasing PAPR.

MIMO System

MIMO technology is not dependent on one antenna path to receive one message, collects a plurality of data pieces received via several antennas, and completes total data. As a result, MIMO technology can increase a data transfer rate within a specific range, or can increase a system range at a specific data transfer rate. Under this situation, MIMO technology is a next-generation mobile communication technology capable of being widely applied to mobile communication terminals or RNs. MIMO technology can extend the range of data communication, so that it can overcome the limited amount of transmission (Tx) data of mobile communication systems reaching a critical situation.

Figure 10:
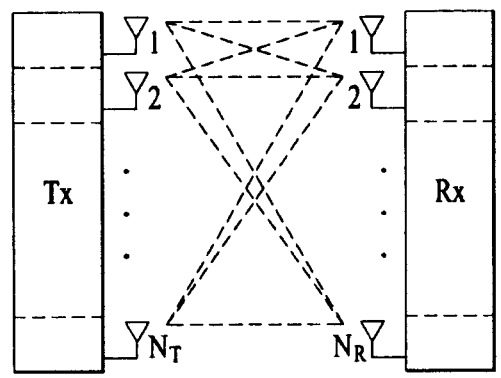
FIG. 10 is a conceptual diagram illustrating a MIMO communication system.
Figure 10:
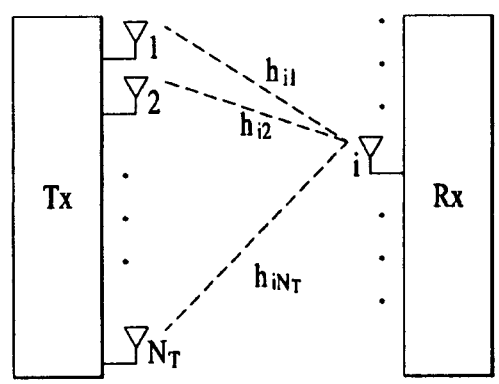

FIG. 10(a) is a block diagram illustrating a general MIMO communication system. Referring to FIG. 10(a), if the number of transmission (Tx) antennas increases to $N_T$, and at the same time the number of reception (Rx) antennas increases to $N_R$, a theoretical channel transmission capacity of the MIMO communication system increases in proportion to the number of antennas, differently from the above-mentioned case in which only a transmitter or receiver uses several antennas, so that transfer rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \qquad \text{[Equation 1]}$$

For example, provided that a MIMO system uses four transmission (Tx) antennas and four reception (Rx) antennas, the MIMO system can theoretically acquire a high transfer rate which is four times higher than that of a one antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 10(a), it is assumed that there are $N_T$ transmission (Tx) antennas and $N_R$ reception (Rx) antennas. In the case of a transmission (Tx) signal, a maximum number of transmission information pieces is $N_T$ under the condition that $N_T$ transmission (Tx) antennas are used, so that the transmission (Tx) information can be represented by a specific vector shown in the following equation 2.

$$s = [s_1, s_2, \ldots, s_{N_T}]^T \qquad \text{[Equation 2]}$$

In the meantime, individual transmission (Tx) information pieces ($s_1, s_2, \ldots, s_{NT}$) may have different transmission powers. In this case, if the individual transmission powers are denoted by ($P_1, P_2, \ldots, P_{NT}$) transmission (Tx) information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{S}$ is a transmission vector, and can be represented by the following equation 4 using a diagonal matrix P of a transmission (Tx) power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{S}$ having an adjusted transmission power is applied to a weight matrix (W), so that $N_T$ transmission (Tx) signals ($x_1, x_2, \ldots, x_{NT}$) to be actually transmitted are configured. In this case, the weight matrix (W) is adapted to properly distribute transmission (Tx) information to individual antennas according to transmission channel situations. The above-mentioned transmission (Tx) signals ($x_1, x_2, \ldots, x_{NT}$) can be represented by the following equation 5 using the vector (X).

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

Next, if $N_R$ reception (Rx) antennas are used, reception (Rx) signals ($y_1, y_2, \ldots, y_{NR}$) of individual antennas can be represented by a specific vector (y) shown in the following equation 6.

$$y = [y_1, y_2, \ldots, y_{N_R}]^T \quad \text{[Equation 6]}$$

In the meantime, if a channel modeling is executed in the MIMO communication system, individual channels can be distinguished from each other according to transmission/reception (Tx/Rx) antenna indexes. A specific channel passing the range from a transmission (Tx) antenna (j) to a reception (Rx) antenna (i) is denoted by $h_{ij}$. In this case, it should be noted that the index order of the channel $h_{ij}$ is located before a reception (Rx) antenna index and is located after a transmission (Tx) antenna index.

Several channels are tied up, so that they are displayed in the form of a vector or matrix. An exemplary vector is as follows. FIG. 10(b) shows channels from $N_T$ transmission (Tx) antennas to a reception (Rx) antenna (i).

Referring to FIG. 10(b), the channels passing the range from the $N_T$ transmission (Tx) antennas to the reception (Rx) antenna (i) can be represented by the following equation 7.

$$h_i^T = [h_{i1}, h_{i2}, \ldots, h_{iN_T}] \quad \text{[Equation 7]}$$

If all channels passing the range from the $N_T$ transmission (Tx) antennas to $N_R$ reception (Rx) antennas are denoted by the matrix shown in Equation 7, the following equation 8 is acquired.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Additive white Gaussian noise (AWGN) is added to an actual channel which has passed the channel matrix (H) shown in Equation 8. The AWGN ($n_1, n_2, \ldots, n_{NR}$) added to each of $N_R$ reception (Rx) antennas can be represented by a specific vector shown in the following equation 9.

[Equation 9]

$$n = [n_1, n_2, \ldots, n_{N_R}]^T$$

A reception signal calculated by the above-mentioned equations can be represented by the following equation 10.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix. Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11.

$$\text{rank}(H) \leq \min(N_T, N_R) \quad \text{[Equation 11]}$$

A variety of MIMO transmission/reception (Tx/Rx) schemes may be used for operating the MIMO system, for example, frequency switched transmit diversity (FSTD), Space Frequency Block Coding (SFBC), Space Time Block Coding (STBC), Cyclic Delay Diversity (CDD), time switched transmit diversity (TSTD), etc. In case of Rank 2 or higher, Spatial Multiplexing (SM), Generalized Cyclic Delay Diversity (GCDD), Selective Virtual Antenna Permutation (S-VAP), etc. may be used.

The FSTD scheme serves to allocate subcarriers having different frequencies to signals transmitted through multiple antennas so as to obtain diversity gain. The SFBC scheme efficiently applies selectivity of a spatial region and a frequency region so as to obtain diversity gain and multiuser scheduling gain. The STBC scheme applies selectivity of a spatial domain and a time region. The CDD scheme serves to obtain diversity gain using path delay between transmission antennas. The TSTD scheme serves to temporally divide signals transmitted through multiple antennas. The spatial multiplexing scheme serves to transmit different data through different antennas so as to increase a transfer rate. The GCDD scheme serves to apply selectivity of a time region and a frequency region. The S-VAP scheme uses a single precoding matrix and includes a Multi Codeword (MCW) S-VAP for mixing multiple codewords among antennas in spatial diversity or spatial multiplexing and a Single Codeword (SCW) S-VAP using a single codeword.

In case of the STBC scheme from among the above-mentioned MIMO transmission schemes, the same data symbol is repeated to support orthogonality in a time domain so that time diversity can be obtained. Similarly, the SFBC scheme enables the same data symbol to be repeated to support orthogonality in a frequency domain so that frequency diversity can be obtained. An exemplary time block code used for STBC and an exemplary frequency block code used for SFBC are shown in Equation 12 and Equation 13, respectively. Equation 12 shows a block code of the case of 2 transmission (Tx) antennas, and Equation 13 shows a block code of the case of 4 transmission (Tx) antennas.

$$\frac{1}{\sqrt{2}} \begin{pmatrix} S_1 & S_2 \\ -S_2^* & S_1^* \end{pmatrix} \quad \text{[Equation 12]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 13]}$$

In Equations 12 and 13, $S_i$ (i=1, 2, 3, 4) means a modulated data symbol. In addition, each row of the matrixes of Equation 12 and 13 may indicate an antenna port, and each column may indicate time (in case of STBC) or frequency (in case of SFBC).

Figure 11:
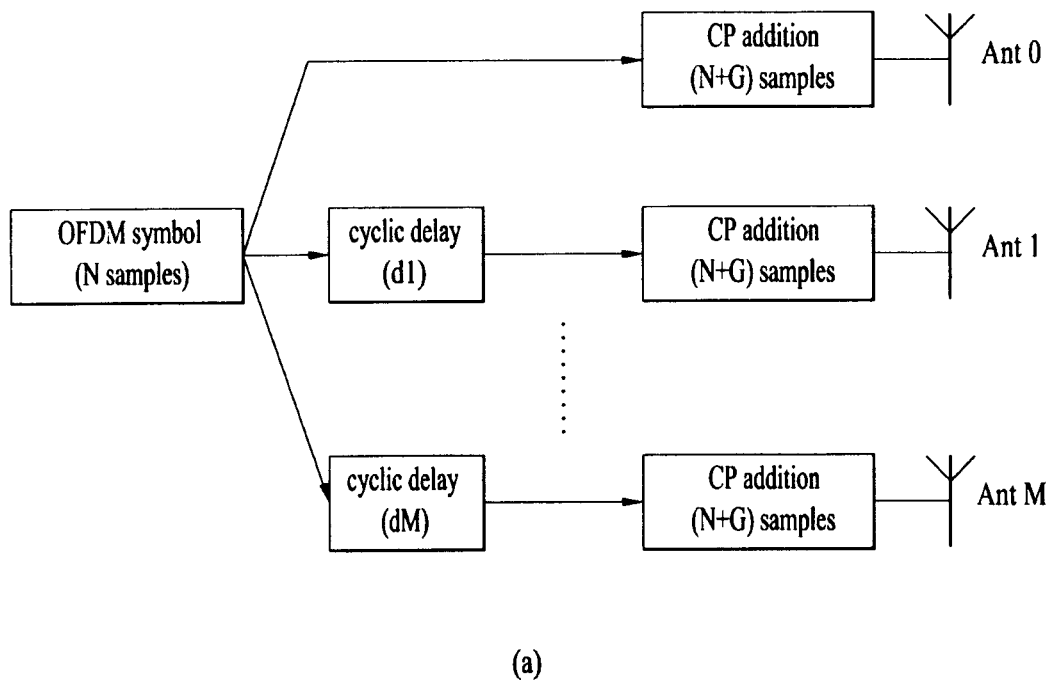
FIG. 11 is a conceptual diagram illustrating a general CDD structure for use in a MIMO system.
Figure 11:
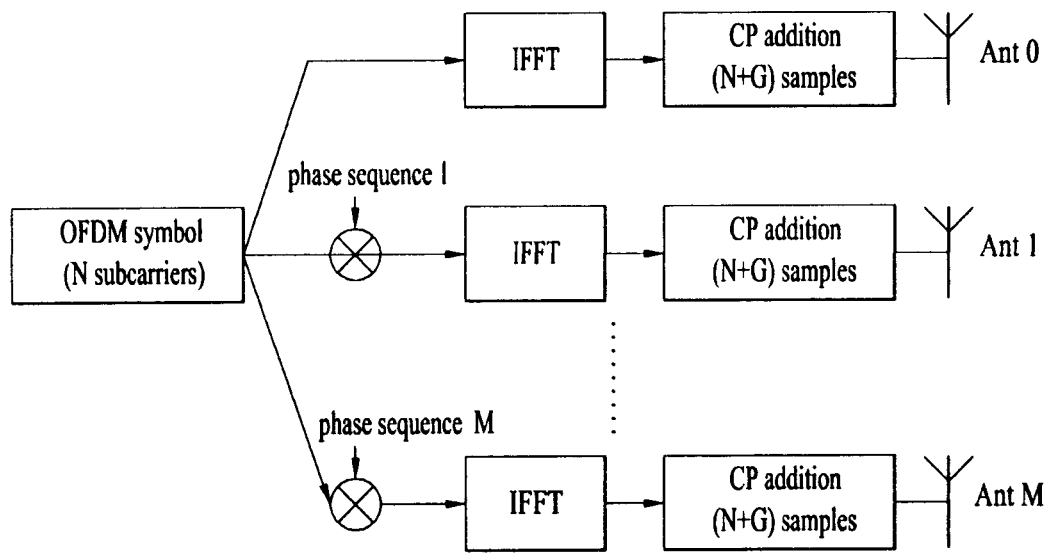

On the other hand, the CDD scheme from among the above-mentioned MIMO transmission schemes mandatorily increases delay spread so as to increase frequency diversity. FIG. 11 is a conceptual diagram illustrating a general CDD structure for use in the MIMO system. FIG. 11(*a*) shows a method for applying cyclic delay to a time domain. If necessary, the CDD scheme based on the cyclic delay of FIG. 11(*a*) may also be implemented as phase-shift diversity of FIG. 11(*b*).

Figure 12:
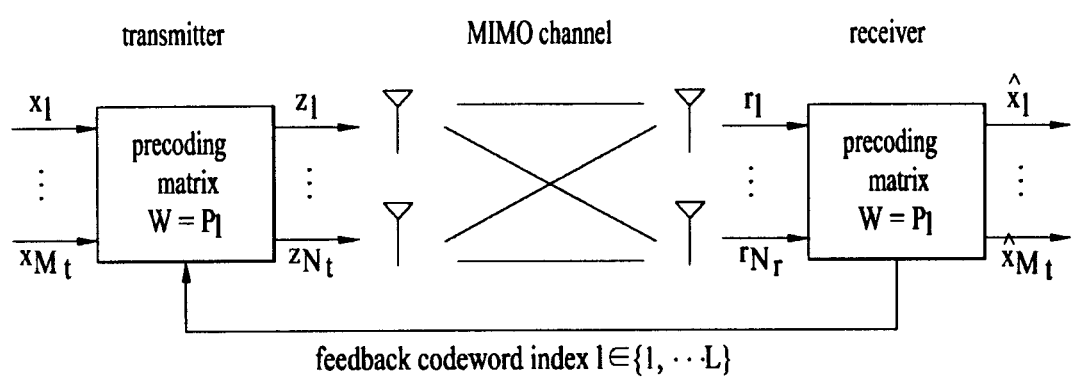
FIG. 12 is a conceptual diagram illustrating codebook-based precoding.

In association with the above-mentioned MIMO transmission techniques, the codebook-based precoding method will hereinafter be described with reference to FIG. 12. FIG. 12 is a conceptual diagram illustrating codebook-based precoding.

In accordance with the codebook-based precoding scheme, a transceiver may share codebook information including a predetermined number of precoding matrixes according to a transmission rank, the number of antennas, etc. That is, if feedback information is infinite, the precoding-based codebook scheme may be used. The receiver measures a channel state through a reception signal, so that an infinite number of preferred precoding matrix information (i.e., an index of the corresponding precoding matrix) may be fed back to the transmitter on the basis of the above-mentioned codebook information. For example, the receiver may select an optimum precoding matrix by measuring an ML (Maximum Likelihood) or MMSE (Minimum Mean Square Error) scheme. Although the receiver shown in FIG. 12 transmits precoding matrix information for each codeword to the transmitter, the scope or spirit of the present invention is not limited thereto.

Upon receiving feedback information from the receiver, the transmitter may select a specific precoding matrix from a codebook on the basis of the received information. The transmitter that has selected the precoding matrix performs a precoding operation by multiplying the selected precoding matrix by as many layer signals as the number of transmission ranks, and may transmit each precoded Tx signal over a plurality of antennas. If the receiver receives the precoded signal from the transmitter as an input, it performs inverse processing of the precoding having been conducted in the transmitter so that it can recover the reception (Rx) signal. Generally, the precoding matrix satisfies a unitary matrix (U) such as ($U^*U^H$=I), so that the inverse processing of the above-mentioned precoding may be conducted by multiplying a Hermit matrix ($P^H$) of the precoding matrix H used in the precoding of the transmitter by the reception (Rx) signal.

Physical Uplink Control Channel (PUCCH)

PUCCH including UL control information will hereinafter be described in detail.

A plurality of UE control information pieces may be transmitted through a PUCCH. When Code Division Multiplexing (CDM) is performed in order to discriminate signals of UEs, a Constant Amplitude Zero Autocorrelation (CAZAC) sequence having a length of 12 is mainly used. Since the CAZAC sequence has a property that a constant amplitude is maintained in a time domain and a frequency domain, a Peak-to-Average Power Ratio (PAPR) of a UE or Cubic Metric (CM) may be decreased to increase coverage. In addition, ACK/NACK information for DL data transmitted through the PUCCH may be covered using an orthogonal sequence.

In addition, control information transmitted through the PUCCH may be discriminated using cyclically shifted sequences having different cyclic shift values. A cyclically shifted sequence may be generated by cyclically shifting a basic sequence (also called a base sequence) by a specific cyclic shift (CS) amount. The specific CS amount is indicated by a CS index. The number of available CSs may be changed according to channel delay spread. Various sequences may be used as the basic sequence and examples thereof include the above-described CAZAC sequence.

PUCCH may include a variety of control information, for example, a Scheduling Request (SR), DL channel measurement information, and ACK/NACK information for DL data transmission. The channel measurement information may include Channel Quality Information (CQI), a Precoding Matrix Index (PMI), and a Rank Indicator (RI).

PUCCH format may be defined according to the type of control information contained in a PUCCH, modulation scheme information thereof, etc. That is, PUCCH format 1 may be used for SR transmission, PUCCH format 1a or 1b may be used for HARQ ACK/NACK transmission, PUCCH format 2 may be used for CQI transmission, and PUCCH format 2a/2b may be used for HARQ ACK/NACK transmission.

If HARQ ACK/NACK is transmitted alone in an arbitrary subframe, PUCCH format 1a or 1b may be used. If SR is transmitted alone, PUCCH format 1 may be used. The UE may transmit the HARQ ACK/NACK and the SR through the same subframe, and a detailed description thereof will hereinafter be described in detail.

PUCCH format may be summarized as shown in Table 1.

TABLE 1

| PUCCH format | Modulation scheme | Number of bits per subframe | Usage | etc. |
|---|---|---|---|---|
| 1 | N/A | N/A | SR(Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

Figure 13:
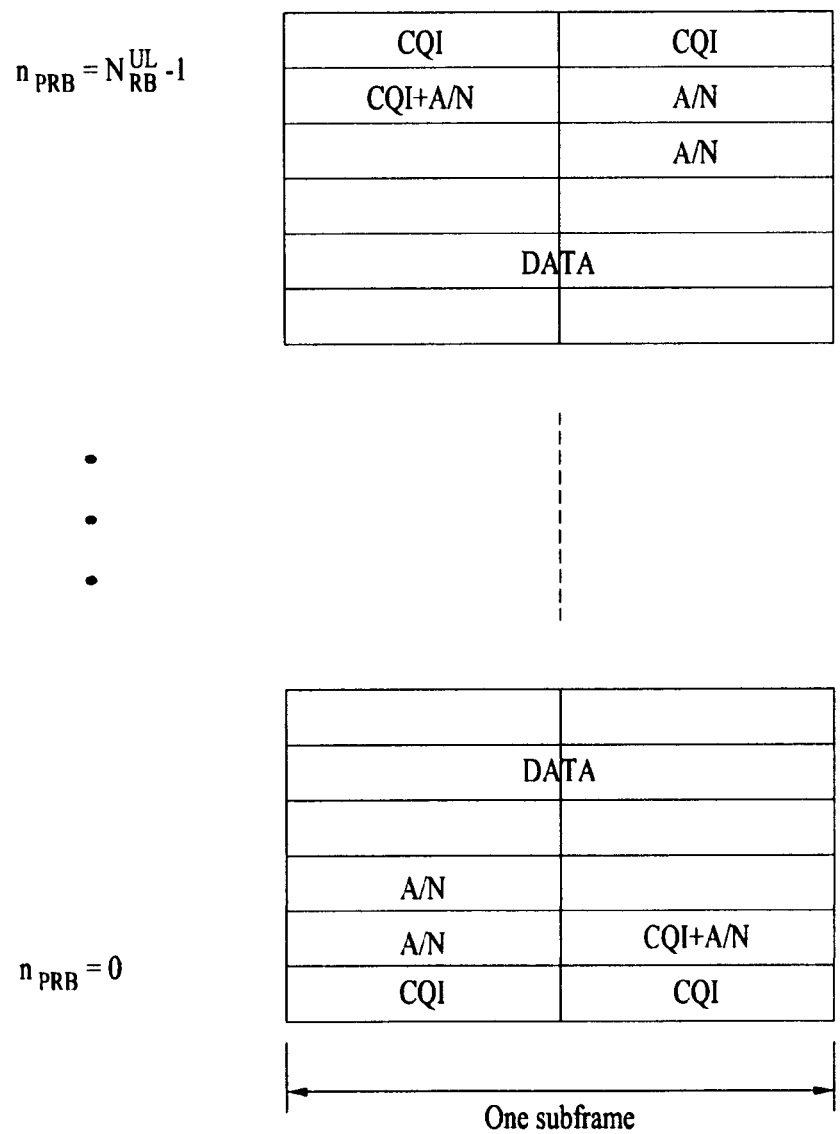
FIG. 13 shows a resource mapping structure of PUCCH.

FIG. 13 shows a PUCCH resource mapping structure for use in a UL physical resource block (PRB). $N_{RB}^{UL}$ is the number of resource blocks (RBs) for use in uplink (UL), and $n_{PRB}$ is a physical resource block (PRB) number. PUCCH may be mapped to both edges of a UL frequency block. CQI resources may be mapped to a PRB located just after the edge of a frequency band, and ACK/NACK may be mapped to this PRB.

PUCCH format 1 may be a control channel used for SR transmission. SR (Scheduling Request) may be transmitted in such a manner that SR is requested or not requested.

PUCCH format 1a/1b is a control channel used for ACK/NACK transmission. In the PUCCH format 1a/1b, a symbol modulated using the BPSK or QPSK modulation scheme is multiplied by a CAZAC sequence of length 12. Upon completion of the CAZAC sequence multiplication, the resultant symbol is blockwise-spread as an orthogonal sequence. A Hadamard sequence of length 4 is applied to general ACK/NACK information, and a DFT (Discrete Fourier Transform) sequence of length 3 is applied to the shortened ACK/NACK information and a reference signal (or reference symbol; RS). A Hadamard sequence of length 2 may be applied to the reference signal for the extended CP.

The UE may also transmit HARQ ACK/NACK and SR through the same subframe. For positive SR transmission, the UE may transmit HARQ ACK/NACK information through resources allocated for the SR. For negative SR transmission, the UE may transmit HARQ ACK/NACK information through resources allocated for ACK/NACK information.

PUCCH format 2/2a/2b will hereinafter be described in detail. PUCCH format 2/2a/2b is a control channel for transmitting channel measurement feedback (CQI, PMI, RI).

The PUCCH format 2/2a/2b may support modulation based on a CAZAC sequence, and a QPSK-modulated symbol may be multiplied by a CAZAC sequence of length 12. Cyclic shift (CS) of the sequence may be changed between a symbol and a slot. For a reference signal (RS), orthogonal covering may be used.

Figure 14:
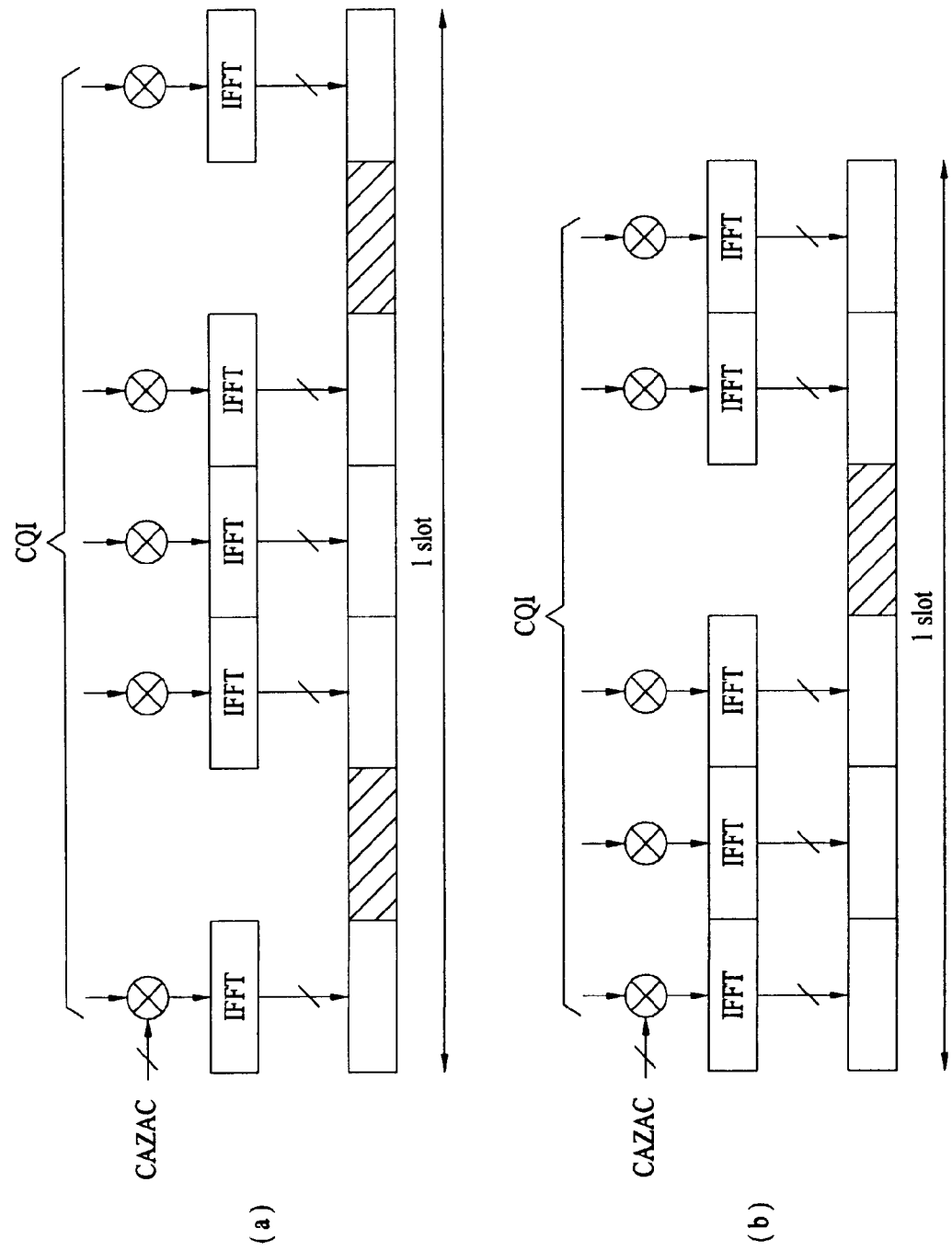
FIG. 14 shows a channel structure of a CQI information bit.
Figure 15:
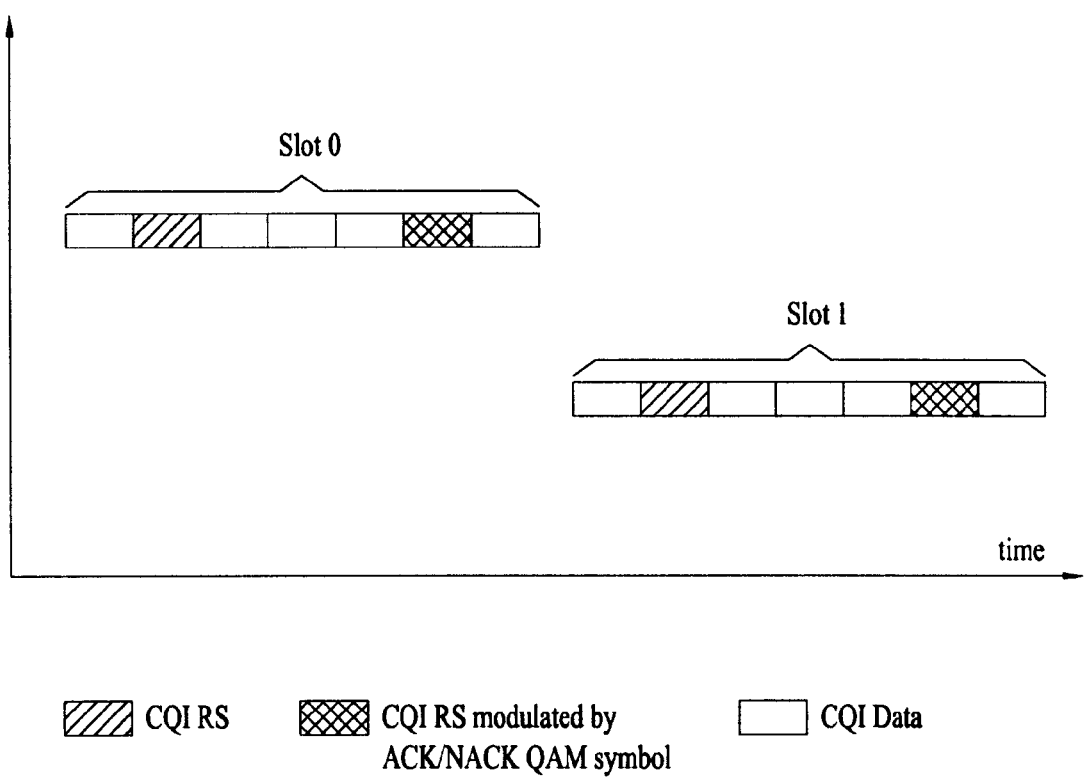
FIG. 15 is a conceptual diagram illustrating transmission of CQI and ACK/NACK information.

FIG. 14 shows a channel structure of a CQI information bit. The CQI bit may include one or more fields. For example, the CQI bit may include a CQI field indicating a CQI index for MCS decision, a PMI field indicating an index of a precoding matrix of a codebook, and an RI field indicating rank.

Referring to FIG. 14(a), a reference signal (RS) may be loaded on two SC-FDMA symbols spaced apart from each other by a predetermined distance corresponding to 3 SC-FDMA symbol intervals from among 7 SC-FDMA symbols contained in one slot, and CQI information may be loaded on the remaining 5 SC-FDMA symbols. The reason why two RSs may be used in one slot is to support a high-speed UE. In addition, each UE may be discriminated by a sequence. CQI symbols may be modulated in the entire SC-FDMA symbol, and the modulated CQI symbols may then be transmitted. The SC-FDMA symbol is composed of one sequence. That is, a UE performs CQI modulation using each sequence, and transmits the modulated result.

The number of symbols that can be transmitted to one TTI is set to 10, and CQI modulation is extended up to QPSK. If QPSK mapping is applied to the SC-FDMA symbol, a CQI value of 2 bits may be loaded on the SC-FDMA symbol, so that a CQI value of 10 bits may be assigned to one slot. Therefore, a maximum of 20-bit CQI value may be assigned to one subframe. A frequency domain spreading code may be used to spread CQI in a frequency domain.

CAZAC sequence (for example, a ZC sequence) may be used as a frequency domain spread code. In addition, another sequence having superior correlation characteristics may be used as the frequency domain spread code. Specifically, CAZAC sequences having different cyclic shift (CS) values may be applied to respective control channels, such that the CAZAC sequences may be distinguished from one another. IFFT may be applied to the frequency domain spread CQI.

FIG. 14(b) shows the example of PUCCH format 2/2a/2b transmission in case of the extended CP. One slot includes 6 SC-FDMA symbols. RS is assigned to one OFDM symbol from among 6 OFDM symbols of each slot, and a CQI bit may be assigned to the remaining 5 OFDM symbols. Except for the six SC-FDMA symbols, the example of the normal CP of FIG. 14(a) may be used without change.

Orthogonal covering applied to the RS of FIGS. 14(a) and 14(b) is shown in Table 2.

TABLE 2

| Normal CP | Extended CP |
|---|---|
| [1 1] | [1] |

Simultaneous transmission of CQI and ACK/NACK information will hereinafter be described with reference to Table 15.

In case of the normal CP, CQI and ACK/NACK information can be simultaneously transmitted using PUCCH format 2a/2b. ACK/NACK information may be transmitted through a symbol where CQI RS is transmitted. That is, a second RS for use in the normal CP may be modulated into an ACK/NACK symbol. In the case where the ACK/NACK symbol is modulated using the BPSK scheme as shown in the PUCCH format 1a, CQI RS may be modulated into the ACK/NACK symbol according to the BPSK scheme. In the case where the ACK/NACK symbol is modulated using the QPSK scheme as shown in the PUCCH format 1b, CQI RS may be modulated into the ACK/NACK symbol according to the QPSK scheme. On the other hand, in case of the extended CP, CQI and ACK/NACK information are simultaneously transmitted using the PUCCH format 2. For this purpose, CQI and ACK/NACK information may be joint-coded.

For details of PUCCH other than the above-mentioned description, the 3GPP standard document (e.g., 3GPP TS36.211 5.4) may be referred to, and detailed description thereof will herein be omitted for convenience of description. However, it should be noted that PUCCH contents disclosed in the above-mentioned standard document can also be applied to a PUCCH used in various embodiments of the present invention without departing from the scope or spirit of the present invention.

Channel State Information (CSI) Feedback

In order to correctly perform MIMO technology, the receiver may feed back a rank indicator (RI), a precoding matrix index (PMI) and channel quality information (CQI) to the transmitter. RI, PMI and CQI may be generically named Channel state Information (CSI) as necessary. Alternatively, the term "CQI" may be used as the concept of channel information including RI, PMI and CQI.

Figure 16:
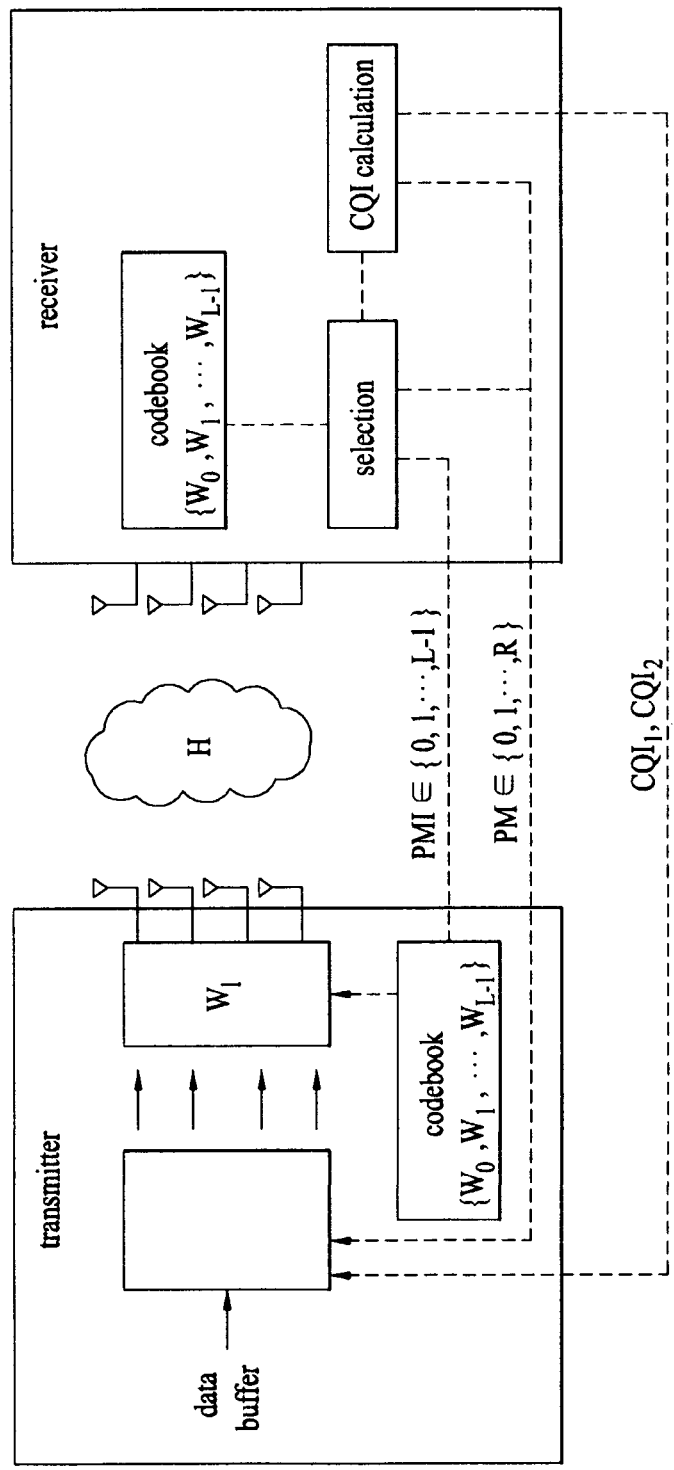
FIG. 16 is a conceptual diagram illustrating feedback of channel state information.

FIG. 16 is a conceptual diagram illustrating a feedback of channel state information.

Referring to FIG. 16, MIMO transmission data from the transmitter may be received at a receiver over a channel (H). The receiver may select a preferred precoding matrix from a codebook on the basis of the received signal, and may feed back the selected PMI to the transmitter. In addition, the receiver may measure a Signal-to-Interference plus Noise Ratio (SINR) of the reception (Rx) signal, calculate channel quality information (CQI), and feed back the calculated CQI to the transmitter. In addition, the receiver may measure a Signal-to-Interference plus Noise Ratio (SINR) of the reception (Rx) signal, calculate a CQI, and feed back the calculated SINR to the transmitter. In addition, the receiver may feed back a rank indicator (RI) of the Rx signal to the transmitter. The transmitter may determine the number of layers suitable for data transmission to the receiver and time/frequency resources, MCS (Modulation and Coding Scheme), etc. using RI and CQI information fed back from the receiver. In addition, the receiver may transmit the precoded Tx signal using the precoding matrix ($W_1$) indicated by a PMI fed back from the receiver over a plurality of antennas.

Channel state information will hereinafter be described in detail.

RI is information regarding a channel rank (i.e., the number of layers for data transmission of a transmitter). RI may be determined by the number of allocated Tx layers, and may be acquired from associated downlink control information (DCI).

PMI is information regarding a precoding matrix used for data transmission of a transmitter. The precoding matrix fed back from the receiver may be determined considering the number of layers indicated by RI. PMI may be fed back in case of closed-loop spatial multiplexing (SM) and large delay cyclic delay diversity (CDD). In the case of open-loop transmission, the transmitter may select a precoding matrix according to predetermined rules. A process for selecting a PMI for each rank (rank 1 to 4) is as follows. The receiver may calculate a post processing SINR in each PMI, convert the calculated SINR into the sum capacity, and select the best PMI on the basis of the sum capacity. That is, PMI calculation of the receiver may be considered to be a process for searching for an optimum PMI on the basis of the sum capacity. The transmitter that has received PMI feedback from the receiver may use a precoding matrix recommended by the receiver. This fact may be contained as a 1-bit indicator in scheduling allocation information for data transmission to the receiver. Alternatively, the transmitter may not use the precoding matrix indicated by a PMI fed back from the transmitter. In this case, precoding matrix information used for data transmission from the transmitter to the receiver may be explicitly contained in the scheduling allocation information. For details of PMI, the 3GPP standard document (e.g., 3GPP TS36.211) may be referred to.

CQI is information regarding channel quality. CQI may be represented by a predetermined MCS combination. CQI index may be given as shown in the following table 3.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Referring to Table 3, CQI index may be represented by 4 bits (i.e., CQI indexes of 0~15). Each CQI index may indicate a modulation scheme and a code rate.

A CQI calculation method will hereinafter be described. The following assumptions (1) to (5) for allowing a UE to calculate a CQI index are defined in the 3GPP standard document (e.g., 3GPP TS36.213).

(1) The first three OFDM symbols in one subframe are occupied by control signaling.

(2) Resource elements (REs) used by a primary synchronization signal, a secondary synchronization signal or a physical broadcast channel (PBCH) are not present.

(3) CP length of a non-MBSFN subframe is assumed.

(4) Redundancy version is set to zero (0).

(5) PDSCH transmission method may be dependent upon a current transmission mode (e.g., a default mode) configured in a UE.

(6) The ratio of PDSCH EPRE (Energy Per Resource Element) to a cell-specific reference signal EPRE may be given with the exception of $\rho_A$. (A detailed description of $\rho_A$ may follow the following assumption. Provided that a UE for an arbitrary modulation scheme may be set to a Transmission Mode 2 having four cell-specific antenna ports or may be set to a Transmission Mode 3 having an RI of 1 and four cell-specific antenna ports, $\rho_A$ may be denoted by $\rho_A = P_A + \Delta_{offset} + 10\log_{10}(2)[dB]$. In the remaining cases, in association with an arbitrary modulation method and the number of arbitrary layers, $\rho_A$ may be denoted by $\rho_A = P_A + \Delta_{offset}[dB]$. $\Delta_{offset}$ is given by a nomPDSCH-RS-EPRE-Offset parameter configured by higher layer signaling.)

Definition of the above-mentioned assumptions (1) to (5) may indicate that a CQI includes not only a CQI but also various information of a corresponding UE. That is, different CQI indexes may be fed back according to a throughput or performance of the corresponding UE at the same channel quality, so that it is necessary to define a predetermined reference for the above-mentioned assumption.

The UE may receive a downlink reference signal (DL RS) from an eNB, and recognize a channel state on the basis of the received DL RS. In this case, the RS may be a common reference signal (CRS) defined in the legacy 3GPP LTE system, and may be a Channel state Information Reference Signal (CSI-RS) defined in a system (e.g., 3GPP LTE-A system) having an extended antenna structure. The UE may satisfy the assumption given for CQI calculation at a channel recognized through a reference signal (RS), and at the same time calculate a CQI index in which a Block Error Rate (BLER) is not higher than 10%. The UE may transmit the calculated CQI index to the eNB. The UE may not apply a method for improving interference estimation to a CQI index calculation process.

The process for allowing the UE to recognize a channel state and calculate an appropriate MCS may be defined in various ways in terms of UE implementation. For example, the UE may calculate a channel state or an effective SINR using a reference signal (RS). In addition, the channel state or the effective SINR may be measured on the entire system bandwidth (also called 'Set S') or may also be measured on some bandwidths (specific subband or specific RB). The CQI for the set S may be referred to as a Wideband (WB) CQI, and the CQI for some bandwidths may be referred to as a subband (SB) CQI. The UE may calculate the highest MCS on the basis of the calculated channel state or effective SINR. The highest MCS may indicate an MCS that satisfies the CQI calculation assumption without exceeding a transport block error rate of 10% during the decoding. The UE may determine a CQI index related to the calculated MCS, and may report the determined CQI index to the eNB.

Further, CQI-only transmission may be considered in which a UE transmits only a CQI. Aperiodic CQI transmission may be event-triggered upon receiving a request from the eNB. Such request from the eNB may be a CQI request defined by one bit of DCI format 0. In addition, for CQI-only transmission, MCS index ($I_{MCS}$) of 29 may be signaled as shown in the following table 4. In this case, the CQI request bit of the DCI format 0 is set to 1, transmission of 4 RBs or less may be configured, Redundancy Version 1 (RV1) is indicated in PUSCH data retransmission, and a modulation order ($Q_m$) may be set to 2. In other words, in the case of CQI-only transmission, only a QPSK (Quadrature Phase Shift Keying) scheme may be used as a modulation scheme.

TABLE 4

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |

TABLE 4-continued

| MCS Index $I_{MCS}$ | Modulation Order $Q_m'$ | TBS Index $I_{TBS}$ | Redundancy Version $rv_{idx}$ |
|---|---|---|---|
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

The CQI reporting operation will hereinafter be described in detail.

In the 3GPP LTE system, when a DL reception entity (e.g., UE) is coupled to a DL transmission entity (e.g., eNB), a Reference Signal Received Power (RSRP) and a Reference Signal Received Quality (RSRQ) that are transmitted via downlink are measured at an arbitrary time, and the measured result may be periodically or event-triggeredly reported to the eNB.

In a cellular OFDM wireless packet communication system, each UE may report DL channel information based on a DL channel condition via uplink, and the eNB may determine time/frequency resources and MCS (Modulation and Coding Scheme) so as to transmit data to each UE using DL channel information received from each UE.

In case of the legacy 3GPP LTE system (e.g., 3GPP LTE Release-8 system), such channel information may be composed of Channel Quality Indication (CQI), Precoding Matrix Indicator (PMI), and Rank Indication (RI). All or some of CQI, PMI and RI may be transmitted according to a transmission mode of each UE. CQI may be determined by the received signal quality of the UE. Generally, CQI may be determined on the basis of DL RS measurement. In this case, a CQI value actually applied to the eNB may correspond to an MCS in which the UE maintains a Block Error Rate (BLER) of 10% or less at the measured Rx signal quality and at the same time has a maximum throughput or performance. In addition, such channel information reporting scheme may be divided into periodic reporting and aperiodic reporting upon receiving a request from the eNB.

Information regarding the aperiodic reporting may be assigned to each UE by a CQI request field of 1 bit contained in uplink scheduling information sent from the eNB to the UE. Upon receiving the aperiodic reporting information, each UE may transmit channel information considering the UE's transmission mode to the eNB over a physical uplink shared channel (PUSCH). If necessary, RI and CQI/PMI need not be transmitted over the same PUSCH.

In case of the aperiodic reporting, a cycle in which channel information is transmitted via an upper layer signal, an offset of the corresponding period, etc. may be signaled to each UE in units of a subframe, and channel information considering a transmission (Tx) mode of each UE may be transmitted to the eNB over a physical uplink control channel (PUCCH) at intervals of a predetermined time. In the case where UL transmission data is present in a subframe to which channel information is transmitted at intervals of a predetermined time, the corresponding channel information may be transmitted together with data over not a PUCCH but a PUSCH together. In case of the periodic reporting over a PUCCH, a limited number of bits may be used as compared to PUSCH. RI and CQI/PMI may be transmitted over the same PUSCH. If the periodic reporting collides with the aperiodic reporting, only the aperiodic reporting may be performed within the same subframe.

In order to calculate a WB CQI/PMI, the latest transmission RI may be used. In a PUCCH reporting mode, RI may be independent of another RI for use in a PUSCH reporting mode. RI may be effective only at CQI/PMI for use in the corresponding PUSCH reporting mode.

The CQI/PMI/RI feedback type for the PUCCH reporting mode may be classified into four feedback types (Type 1 to Type 4). Type 1 is CQI feedback for a user-selected subband. Type 2 is WB CQI feedback and WB PMI feedback. Type 3 is RI feedback. Type 4 is WB CQI feedback.

Referring to Table 5, in the case of periodic reporting of channel information, a reporting mode is classified into four reporting modes (Modes 1-0, 1-1, 2-0 and 2-1) according to CQI and PMI feedback types.

transmission of two codewords, the WB spatial differential CQI may indicate a differential value between a WB CQI index for Codeword 1 and a WB CQI index for Codeword 2. These differential values may be assigned to the set {−4, −3, −2, −1, 0, 1, 2, 3}, and each differential value may be assigned to any one of values contained in the set and be represented by 3 bits. In case of Mode 1-1, Feedback Type 2 and Feedback Type may be multiplexed at different time points within the predetermined reporting period, and then transmitted.

Mode 2-0 may indicate that no PMI is transmitted and a CQI of a UE-selected band is transmitted. In this case, RI may be transmitted only in case of open loop spatial multiplexing (OL SM), a WB CQI denoted by 4 bits may be transmitted. In each Bandwidth Part (BP), Best-1 CQI may be transmitted, and Best-1 CQI may be denoted by 4 bits. In addition, an indicator of L bits indicating Best-1 may be further transmitted. If RI is higher than '1', CQI for a first codeword may be transmitted. In case of Mode 2-0, the above-mentioned feedback type 1, feedback type 3, and feedback type 4 may be multiplexed at different time points within a predetermined reporting period, and then transmitted.

Mode 2-1 may indicate an exemplary case in which a single PMI and a CQI of a UE-selected band are transmitted. In this

TABLE 5

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

The reporting mode is classified into a wideband (WB) CQI and a subband (SB) CQI according to a CQI feedback type. The reporting mode is classified into a No-PMI and a Single PMI according to transmission or non-transmission of PMI. As can be seen from Table 5, 'NO PMI' may correspond to an exemplary case in which an Open Loop (OL), a Transmit Diversity (TD), and a single antenna are used, and 'Single PMI" may correspond to an exemplary case in which a closed loop (CL) is used.

Mode 1-0 may indicate an exemplary case in which PMI is not transmitted but only WB CQI is transmitted. In case of Mode 1-0, RI may be transmitted only in the case of Spatial Multiplexing (SM), and one WB CQI denoted by 4 bits may be transmitted. If RI is higher than '1', a CQI for a first codeword may be transmitted. In case of Mode 1-0, Feedback Type 3 and Feedback Type 4 may be multiplexed at different time points within the predetermined reporting period, and then transmitted. The above-mentioned Mode 1-0 transmission scheme may be referred to as Time Division Multiplexing (TDM)-based channel information transmission.

Mode 1-1 may indicate an exemplary case in which a single PMI and a WB CQI are transmitted. In this case, 4-bit WB CQI and 4-bit WB PMI may be transmitted simultaneously with RI transmission. In addition, if RI is higher than '1', 3-bit WB Spatial Differential CQI may be transmitted. In case of case, WB CQI of 4 bits, WB spatial differential CQI of 3 bits, and WB PMI of 4 bits are transmitted simultaneously with RI transmission. In addition, a Best-1 CQI of 4 bits and a Best-indicator of L bits may be simultaneously transmitted at each bandwidth part (BP). If RI is higher than '1', a Best-1 spatial differential CQI of 3 bits may be transmitted. During transmission of two codewords, a differential value between a Best-1 CQI index of Codeword 1 and a Best-1 CQI index of Codeword 2 may be indicated. In Mode 2-1, the above-mentioned feedback type 1, feedback 2, and feedback type 3 may be multiplexed at different time points within a predetermined reporting period, and then transmitted.

In the UE selected SB CQI reporting mode, the size of BP (Bandwidth Part) subband may be defined by the following table 6.

TABLE 6

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |

TABLE 6-continued

| System Bandwidth $N_{RB}^{DL}$ | Subband Size k (RBs) | Bandwidth Parts (J) |
|---|---|---|
| 27-63 | 6 | 3 |
| 64-110 | 8 | 4 |

Table 6 shows a bandwidth part (BP) configuration and the subband size of each BP according to the size of a system bandwidth. A UE may select a preferred subband within each BP, and calculate a CQI for the corresponding subband. In Table 6, if the system bandwidth is set to 6 or 7, this means no application of both the subband size and the number of bandwidth parts (BPs). That is, the system bandwidth of 6 or 7 means application of only WB CQI, no subband state, and a BP of 1.

Figure 17:
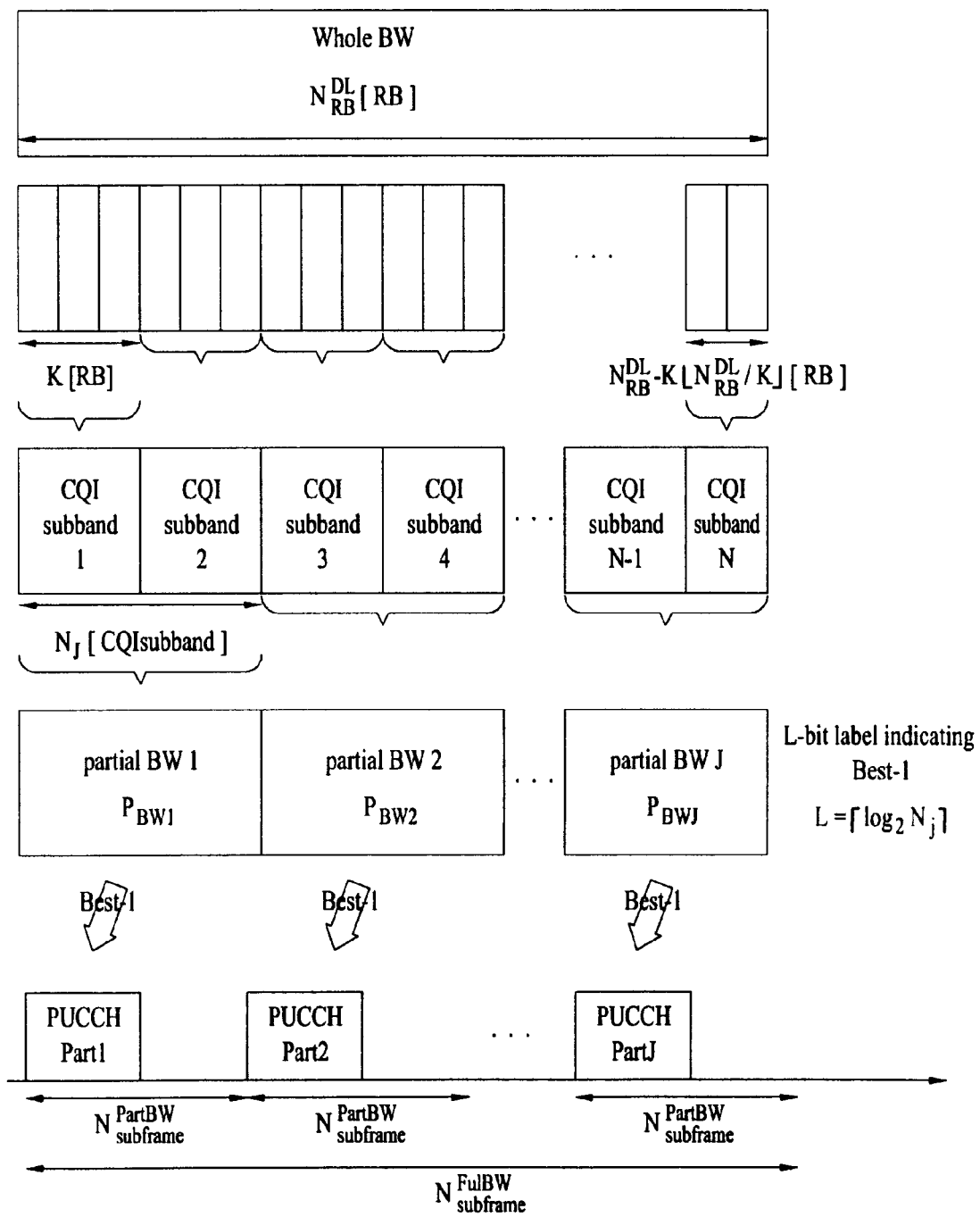
FIG. 17 shows an example of a CQI report mode.

FIG. 17 shows an example of a UE selected CQI reporting mode.

$N_{RB}^{DL}$ is the number of RBs of the entire bandwidth. The entire bandwidth may be divided into N CQI subbands (1, 2, 3, . . . , N). One CQI subband may include k RBs defined in Table 6. If the number of RBs of the entire bandwidth is not denoted by an integer multiple of k, the number of RBs contained in the last CQI subband (i.e., the N-th CQI subband) may be determined by the following equation 14.

$$N_{RB}^{DL} - k \cdot \lfloor N_{RB}^{DL}/k \rfloor \quad \text{[Equation 14]}$$

In Equation 14, ⌊ ⌋ represents a floor operation, and ⌊x⌋ or floor(x) represents a maximum integer not higher than 'x'.

In addition, $N_J$ CQI subbands construct one BP, and the entire bandwidth may be divided into J BPs. UE may calculate a CQI index for one preferred Best-1 CQI subband in contained in one BP, and transmit the calculated CQI index over a PUCCH. In this case, a Best-1 indicator indicating which a Best-1 CQI subband is selected in one BP may also be transmitted. The Best-1 indicator may be composed of L bits, and L may be represented by the following equation 15.

$$L = \lceil \log_2 N_J \rceil \quad \text{[Equation 15]}$$

In Equation 15, ⌈ ⌉ may represent a ceiling operation, and ⌈x⌉ or ceiling(x) may represent a minimum integer not higher than 'x'.

In the above-mentioned UE selected CQI reporting mode, a frequency band for CQI index calculation may be determined. Hereinafter, a CQI transmission cycle will hereinafter be described in detail.

Each UE may receive information composed of a combination of a transmission cycle of channel information and an offset from an upper layer through RRC signaling. The UE may transmit channel information to an eNB on the basis of the received channel information transmission cycle information.

Figure 18:
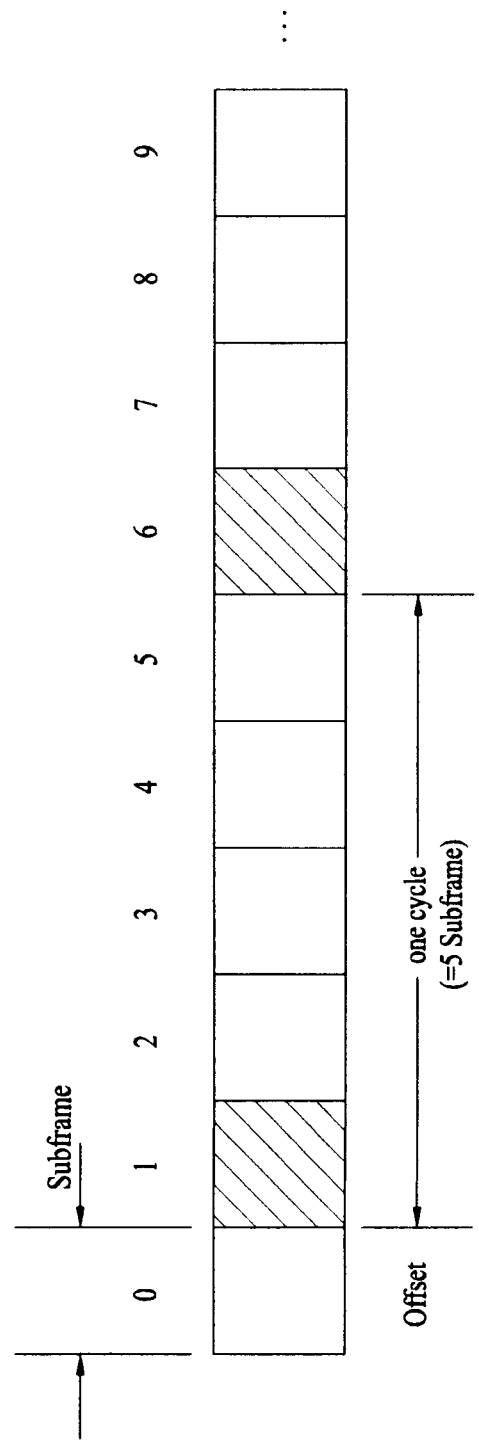
FIG. 18 is a conceptual diagram illustrating a method for enabling a user equipment (UE) to periodically transmit channel information.

FIG. 18 is a conceptual diagram illustrating a method for enabling a UE to periodically transmit channel information. For example, if a UE receives combination information in which a channel information transmission cycle is set to 5 and an offset is set to 1, the UE transmits channel information in units of 5 subframes, one subframe offset is assigned in the increasing direction of a subframe index on the basis of the $0^{th}$ subframe, and channel information may be assigned over a PUCCH. In this case, the subframe index may be comprised of a combination of a system frame number ($n_f$) and 20 slot indexes ($n_s$, 0~19) present in the system frame. One subframe may be comprised of 2 slots, such that the subframe index may be represented by $10 \times n_f + \text{floor}(n_s/2)$.

One type for transmitting only WB CQI and the other type for transmitting both WB CQI and SB CQI may be classified according to CQI feedback types. In case of the first type for transmitting only the WB CQI, WB CQI information for the entire band is transmitted at a subframe corresponding to each CQI transmission cycle. The WB periodic CQI feedback transmission cycle may be set to any of 2, 5, 10, 16, 20, 32, 40, 64, 80, or 160 ms or no transmission of the WB periodic CQI feedback transmission cycle may be established. In this case, if it is necessary to transmit PMI according to the PMI feedback type of Table 5, PMI information is transmitted together with CQI. In case of the second type for transmitting both WB CQI and SB CQI, WB CQI and SB CQI may be alternately transmitted.

Figure 19:
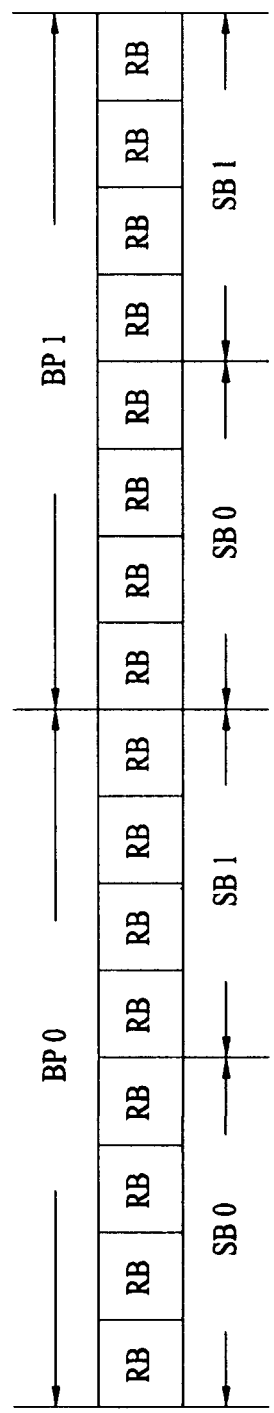
FIG. 19 is a conceptual diagram illustrating SB CQI transmission.

FIG. 19 is a conceptual diagram illustrating a method for transmitting both WB CQI and SB CQI according to an embodiment of the present invention. FIG. 19 shows an exemplary system comprised of 16 RBs. If a system frequency band is comprised of 16 RBs, for example, it is assumed that two bandwidth parts (BPs) (BP0 and BP1) may be configured, each BP may be composed of 2 subbands (SBs) (SB0 and SB1), and each SB may be composed of 4 RBs. In this case, as previously stated in Table 6, the number of BPs and the size of each SB are determined according to the number of RBs contained in the entire system band, and the number of SBs contained in each BP may be determined according to the number of RBs, the number of BPs and the size of SB.

In case of the type for transmitting both WB CQI and SB CQI, the WB CQI is transmitted to the CQI transmission subframe. In the next transmission subframe, a CQI of one SB (i.e., Best-1) having a good channel state from among SB0 and SB1 at BP0 and an index (i.e., Best-1 indicator) of the corresponding SB are transmitted. In the further next transmission subframe, a CQI of one SB (i.e., Best-1) having a good channel state from among SB0 and SB1 at BP1 and an index (i.e., Best-1 indicator) of the corresponding SB are transmitted. After transmitting the WB CQI, CQIs of individual BPs are sequentially transmitted. In this case, CQI of a BP located between a first WB CQI transmitted once and a second WB CQI to be transmitted after the first WB CQI may be sequentially transmitted one to four times. For example, if the CQI of each BP is transmitted once during a time interval between two WB CQIs, CQIs may be transmitted in the order of WB CQI→BP0 CQI→BP1 CQI→WB CQI. In another example, if the CQI of each BP is transmitted four times during a time interval between two WB CQIs, CQIs may be transmitted in the order of WB CQI→BP0 CQI→BP1 CQI→BP0 CQI→BP1 CQI→BP0 CQI→BP1 CQI→BP0 CQI→BP1 CQI→WB CQI. Information about the number of sequential transmission times of BP CQI during a time interval between two WB CQIs is signaled through a higher layer. Irrespective of WB CQI or SB CQI, the above-mentioned information about the number of sequential transmission times of BP CQI may be transmitted through a PUCCH in a subframe corresponding to information of a combination of channel information transmission cycle signaled from the higher layer of FIG. 18 and an offset.

In this case, if PMI also needs to be transmitted according to the PMI feedback type, PMI information and CQI must be simultaneously transmitted. If PUSCH for UL data transmission is present in the corresponding subframe, CQI and PMI can be transmitted along with data through PUSCH instead of PUCCH.

Figure 20:
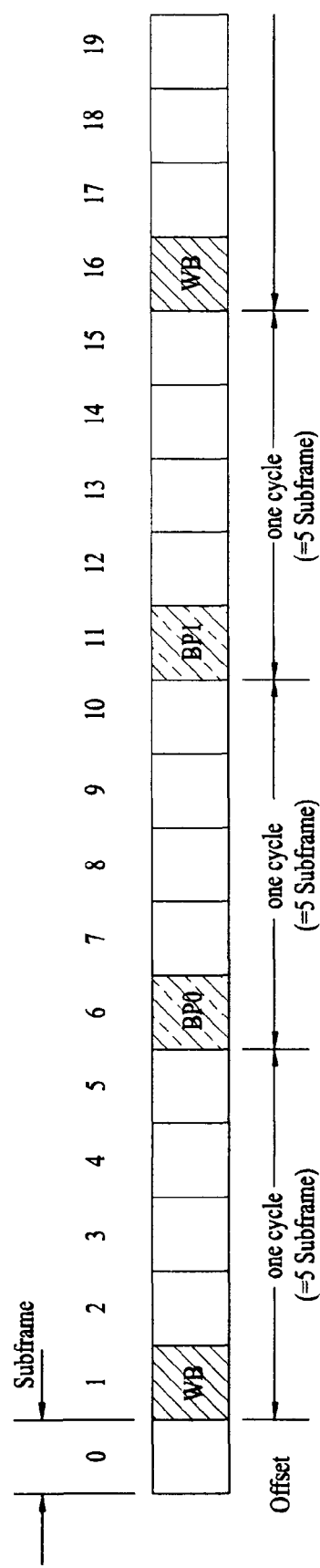
FIG. 20 is a conceptual diagram illustrating transmission of WB CQI and SB CQI.

FIG. 20 is a conceptual diagram illustrating an exemplary CQI transmission scheme when both WB CQI and SB CQI are transmitted. In more detail, provided that combination information in which a channel information transmission cycle is set to 5 and an offset is set to 1 is signaled as shown in FIG. 18, and BP information between two WB CQI/PMI parts is sequentially transmitted once, FIG. 20 shows the example of channel information transmission operation of a UE.

On the other hand, in case of RI transmission, RI may be signaled by information of a combination of one signal indicating how many WB CQI/PMI transmission cycles are used for RI transmission and an offset of the corresponding transmission cycle. In this case, the offset may be defined as a relative offset for a CQI/PMI transmission offset. For example, provided that an offset of the CQI/PMI transmission cycle is set to 1 and an offset of the RI transmission cycle is set to zero, the offset of the RI transmission cycle may be identical to that of the CQI/PMI transmission cycle. The offset of the RI transmission cycle may be defined as a negative value or zero.

Figure 21:
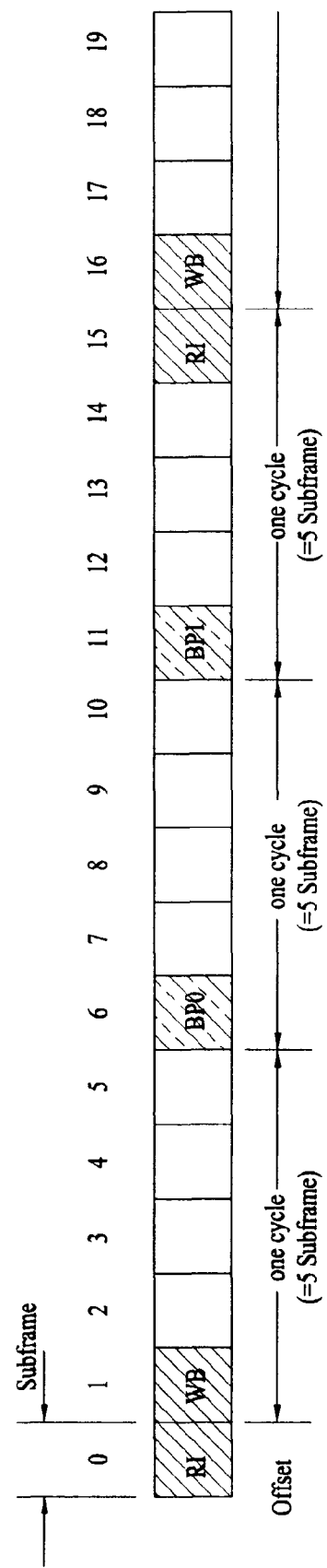
FIG. 21 is a conceptual diagram illustrating transmission of WB CQI, SB CQI and RI.

FIG. 21 is a conceptual diagram illustrating transmission of WB CQI, SB CQI and RI. In more detail, FIG. 21 shows that, under CQI/PMI transmission of FIG. 20, an RI transmission cycle is one time the WB CQI/PMI transmission cycle and the offset of RI transmission cycle is set to '−1'. Since the RI transmission cycle is one time the WB CQI/PMI transmission cycle, the RI transmission cycle has the same time cycle. A relative difference between the RI offset value '−1' and the CQI offset '1' of FIG. 20 is set to '−1', such that RI can be transmitted on the basis of the subframe index '0'.

In addition, provided that RI transmission overlaps with WB CQI/PMI transmission or SB CQI/PMI transmission, WB CQI/PMI or SB CQI/PMI may drop. For example, provided that the RI offset is set to '0' instead of '−1', the WB CQI/PMI transmission subframe overlaps with the RI transmission subframe. In this case, WB CQI/PMI may drop and RI may be transmitted.

By the above-mentioned combination, CQI, PMI, and RI may be transmitted, and such information may be transmitted from each UE by RRC signaling of a higher layer. The BS (or eNB) may transmit appropriate information to each UE in consideration of a channel situation of each UE and a distribution situation of UEs contained in the BS (or eNB).

Meanwhile, payload sizes of SB CQI, WB CQI/PMI, RI and WB CQI in association with the PUCCH report type may be represented by the following table 7.

TABLE 7

| PUCCH Report Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 2 | Wideband CQI/PMI | 2 TX Antennas RI = 1 | 6 | 6 | NA | NA |
| | | 4 TX Antennas RI = 1 | 8 | 8 | NA | NA |
| | | 2 TX Antennas RI > 1 | 8 | 8 | NA | NA |
| | | 4 TX Antennas RI > 1 | 11 | 11 | NA | NA |
| 3 | RI | 2-layer spatial multiplexing | 1 | 1 | 1 | 1 |
| | | 4-layer spatial multiplexing | 2 | 2 | 2 | 2 |
| 4 | Wideband CQI | RI = 1 or RI > 1 | NA | NA | 4 | 4 |

Aperiodic transmission of CQI, PMI and RI over a PUSCH will hereinafter be described.

In case of the aperiodic reporting, RI and CQI/PMI may be transmitted over the same PUSCH. In case of the aperiodic reporting mode, RI reporting may be effective only for CQI/PMI reporting in the corresponding aperiodic reporting mode. CQI-PMI combinations capable of being supported to all the rank values are shown in the following table 8.

TABLE 8

| | | PMI Feedback Type | |
|---|---|---|---|
| | | No PMI (OL, TD, single-antenna) | with PMI (CL) |
| PUSCH CQI Feedback Type | Wideband (Wideband CQI) | | Mode 1-2: Multiple PMI RI $1^{st}$ Wideband CQI (4 bit) $2^{nd}$ Wideband CQI (4 bit) if RI > 1 subband PMIs on each subband |
| | UE Selected (Subband CQI) | Mode 2-0 RI (only for Open-Loop SM) Wideband CQI (4 bit) + Best-M CQI (2 bit) Best-M index when RI > 1, CQI of first codeword | Mode 2-2: Multiple PMI RI $1^{st}$ Wideband CQI (4 bit) + Best-M CQI(2 bit) $2^{nd}$ Wideband CQI (4 bit) + Best-M CQI(2 bit) if RI > 1 Wideband PMI + Best-M PMI Best-M index |

TABLE 8-continued

| | PMI Feedback Type | |
|---|---|---|
| | No PMI (OL, TD, single-antenna) | with PMI (CL) |
| Higher Layer-configured (subband CQI) | Mode 3-0<br>RI (only for Open-Loop SM)<br>Wideband CQI (4 bit) +<br>subband CQI (2 bit)<br>when RI > 1, CQI of first codeword | Mode 3-1: Single PMI<br>RI<br>$1^{st}$ Wideband CQI (4 bit) +<br>subband CQI (2 bit)<br>$2^{nd}$ Wideband CQI (4 bit) +<br>subband CQI (2 bit) if RI > 1<br>Wideband PMI |

Mode 1-2 of Table 8 may indicate a WB feedback. In Mode 1-2, a preferred precoding matrix for each subband may be selected from a codebook subset on the assumption of transmission only in the corresponding subband. The UE may report one WB CQI at every codeword, and WB CQI may be calculated on the assumption that data is transmitted on subbands of the entire system bandwidth (Set S) and the corresponding selected precoding matrix is used on each subband. The UE may report the selected PMI for each subband. In this case, the subband size may be given as shown in the following table 9. In Table 9, if the system bandwidth is set to 6 or 7, this means no application of the subband size. That is, the system bandwidth of 6 or 7 means application of only WB CQI and no subband state.

TABLE 9

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

In Table 8, Mode 3-0 and Mode 3-1 show a subband feedback configured by a higher layer (also called an upper layer).

In Mode 3-0, the UE may report a WB CQI value calculated on the assumption of data transmission on the set-S (total system bandwidth) subbands. The UE may also report one subband CQI value for each subband. The subband CQI value may be calculated on the assumption of data transmission only at the corresponding subband. Even in the case of RI>1, WB CQI and SB CQI may indicate a channel quality for Codeword 1.

In Mode 3-1, a single precoding matrix may be selected from a codebook subset on the assumption of data transmission on the set-S subbands. The UE may report one SB CQI value for each codeword on each subband. The SB CQI value may be calculated on the assumption of a single precoding matrix used in all subbands and data transmission on the corresponding subband. The UE may report a WB CQI value for each codeword. The WB CQI value may be calculated on the assumption of a single precoding matrix used in all the subbands and data transmission on the set-S subbands. The UE may report one selected precoding matrix indicator. The SB CQI value for each codeword may be represented by a differential WB CQI value using a 2-bit subband differential CQI offset. That is, the subband differential CQI offset may be defined as a differential value between a SB CQI index and a WB CQI index. The subband differential CQI offset value may be assigned to any one of four values {−2, 0, +1, +2}. In addition, the subband size may be given as shown in the following table 7.

In Table 8, Mode 2-0 and Mode 2-2 illustrate a UE selected subband feedback. Mode 2-0 and Mode 2-2 illustrate reporting of best-M averages.

In Mode 2-0, the UE may select the set of M preferred subbands (i.e., best-M) from among the entire system bandwidth (set S). The size of one subband may be given as k, and k and M values for each set-S range may be given as shown in the following table 10. In Table 10, if the system bandwidth is set to 6 or 7, this means no application of both the subband size and the M value. That is, the system bandwidth of 6 or 7 means application of only WB CQI and no subband state.

The UE may report one CQI value reflecting data transmission only at the best-M subbands (i.e., M selected subbands). This CQI value may indicate a CQI for Codeword 1 even in the case of RI>1. In addition, the UE may report a WB CQI value calculated on the assumption of data transmission on the set-S subbands. The WB CQI value may indicate a CQI for Codeword 1 even in the case of RI>1.

TABLE 10

| System Bandwidth $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

In Mode 2-2, the UE may select the set of M preferred subbands (i.e., best-M) from among the set-S subbands (where the size of one subband is set to k). Simultaneously, one preferred precoding matrix may be selected from among a codebook subset to be used for data transmission on the M selected subbands. The UE may report one CQI value for each codeword on the assumption that data transmission is achieved on M selected subbands and selection precoding matrices are used in each of the M subbands. The UE may report an indicator of one precoding matrix selected for the M subbands. In addition, one precoding matrix (i.e., a precoding matrix different from the precoding matrix for the above-mentioned M selected subbands) may be selected from among the codebook subset on the assumption that data transmission is achieved on the set-S subbands. The UE may report a WB CQI, that is calculated on the assumption that data transmission is achieved on the set-S subbands and one precoding matrix is used in all the subbands, at every codeword. The UE may report an indicator of the selected one precoding matrix in association with all subbands.

In association with entirety of UE-selected subband feedback modes (Mode 2-0 and Mode 2-2), the UE may report the positions of M selected subbands using a combination index (r), where r may be represented by the following equation 16.

$$r = \sum_{i=0}^{M-1} \binom{N-s_i}{M-i}$$ [Equation 16]

In Equation 16, the set $$\{s_i\}_{i=0}^{M-1}, (1 \le s_i \le N, s_i < s_{i+1})$$

may include M sorted subband indexes. In Equation 14, $$\binom{x}{y}$$

may indicate an extended binomial coefficient, which is set to $$\binom{x}{y}$$

in case of x≥y and is set to zero (0) in case of x<y. Therefore, r may have a unique label and may be denoted by $$r \in \left\{0, \ldots, \binom{N}{M} - 1\right\}.$$

In addition, a CQI value for M selected subbands for each codeword may be denoted by a relative differential value in association with a WB CQI. The relative differential value may be denoted by a differential CQI offset level of 2 bits, and may have a value of 'CQI index-WB CQI index' of M selected subbands. An available differential CQI value may be assigned to any one of four values {+1, +2, +3, +4}.

In addition, the size(k) of supported subbands and the M value may be given as shown in Table 10. As shown in Table 10, k or M may be given as a function of a system bandwidth.

A label indicating the position of each of M selected subbands (i.e., best-M subbands) may be denoted by L bits, where L is denoted by $$L = \left\lceil \log_2 \binom{N}{M} \right\rceil.$$

Feedback Information for Multiple MIMO Transmission Modes

As described above, Channel state Information (CSI) is required for MIMO transmission. The CSI may be fed back from the receiver to the transmitter. The transmitter may acquire a precoding weight, that is capable of being adaptively used in response to a channel state, from the CSI. In addition, the transmitter may acquire signal transmission information from the CSI modified by the precoding weight to be used for MIMO transmission. For example, the signal transmission information may include a modulation order, a coding rate, a transport block size, a scheduling band, etc.

The receiver may obtain channel state information (CSI) between the transmitter and the receiver using a reference signal (RS) received from the transmitter, and may feed back (or report) the obtained CSI to the transmitter. In this case, a variety of methods may be used to reduce the amount of feedback CSI. For example, a channel quality information/index (CQI), a precoding matrix index (PMI), a rank indicator (RI), etc. can be represented by quantized bits, such that the amount of feedback information is reduced, resulting in the implementation of efficient transmission.

Specifically, information regarding a rank suitable for MIMO transmission is changed according to long term fading, such that the above-mentioned rank information is not changed for a relatively longer term as compared to other CSI. On the other hand, PMI or CQI reflects a channel state abruptly changed by short-term fading, such that it is changed for a relatively short time. Accordingly, RI may be reported for a relatively longer term as compared to PMI/CQI, and the PMI and CQI may be reported for a relatively short term as compared to the RI. In addition, PMI and CQI are determined according to a rank used for transmission, such that the PMI and CQI are calculated on the basis of the determined RI until reaching the next RI report period.

As described above, there is a need for a rank value to be first determined when calculating channel state information (CSI). The rank value may be determined considering a MIMO transmission scheme. The MIMO transmission method may be classified into a Multi-User MIMO (MU-MIMO) and a Single-User MIMO (SU-MIMO). If a spatial channel capable of being created through multiple antennas is assigned to multiple users, this means the MU-MIMO. In contrast, if all spatial channels are assigned to a single user, this means SU-MIMO.

The MU-MIMO transmission scheme can be classified into a method for using a non-unitary matrix such as Dirty Paper Coding (DPC), Zero Forcing, etc. and a method for using a unitary precoding weight such as a Per-User Unitary Rate Control (PU2RC). The two methods are characterized in that the precoding weight calculated on the basis of the limited transmission rank is reported to the transmitter from the viewpoint of a single user. For example, a multi-antenna transmitter including M transmission (Tx) antennas can generate a maximum of 8 spatial channels and can transmit signals. The number of spatial channels capable of being assigned to the receiver participating in MU-MIMO transmission may be set to M or less. In this case, a maximum number of spatial channels assigned to each user is limited to N (where N<M), such that spatial channels of N or less may be received. Assuming that a maximum of N transport spatial channels can be assigned to the UE, the UE selects a rank that is most appropriate for transmission. That is, the UE may select the most appropriate rank from among the N or less ranks (i.e., 1 to N ranks). The precoding weight and the channel quality information (CQI) can be calculated according to the selected rank.

For example, if the number of spatial channels assigned to one receiver is limited to 2, the receiver can measure channel state information (CSI) on the assumption that one or two spatial channels can be assigned to the receiver. In this case, the amount of channel state information that must be measured and reported by the receiver can be greatly reduced. That is, rank information is limited to N or 2, such that the number of required bits is reduced from log 2(N) to log 2(2).

PMI amount is determined according to the defined codebook set. Assuming that L codebook sets from Rank 1 to Rank N are defined and K (where K<L) codebook sets from Rank 1 to Rank 2 are defined, the amount of feedback information requisite for PMI reporting in case of a maximum rank limited to N~2 is reduced.

CQI must be calculated according to each codeword (CW). Provided that a system having multiple codewords (MCW) includes a maximum of 2 CWs on Rank-2 transmission, 2 CQIs should be reported for transmission of Rank-2 or higher. Provided that a maximum of 2 spatial channels are assigned, the same amount of CQI (i.e., 2 CQIs) may be reported.

The transmitter can calculate CQI in consideration of the number of transmission layers. Provided that Rank-2 is used in MCW transmission, the second layer calculates SINR in consideration of interference when calculating a CQI of a CW transmitted through a first layer. Similarly, the number of spatial channels simultaneously created by the transmitter is recognized by the receiver, the receiver measures channels status information (CSI) appropriate for the maximum number of spatial channels created by the transmitter. In this case, the accuracy of CQI may be increased. For example, provided that a maximum of 2 spatial channels are formed by the transmitter and each spatial channel is assigned to two users, the receiver may calculate the CQI on the assumption that there is an interference layer in CQI calculation.

On the other hand, SU-MIMO transmission is characterized in that one user uses all spatial channels created by the transmitter. The receiver may report rank information appropriate for transmission to a base station (BS), and the receiver may report PMI and CQI calculated on the basis of the rank information. For example, provided that a maximum number of spatial channels created by the transmitter is set to N, the receiver selects a transmission rank capable of obtaining the highest transmission efficiency from among 1 to N ranks, and reports the selected rank to an eNode B.

The transmitter can simultaneously support SU-MIMO transmission and MU-MIMO transmission. Specialized control signals may be requested for individual SU-MIMO and MU-MIMO transmission. For example, a maximum of N ranks may be received in SU-MIMO transmission, and the transmitter for MU-MIMO transmission may generate a maximum of N spatial channels. If the receiver considers a maximum of N spatial channels as the effective spatial channels corresponding to individual users, a control signal optimized for each transmission mode may be transmitted. In this case, the transmitter transmits indication information regarding the transmission mode to the receiver, such that the receiver may pre-recognize which transmission mode is to be used for signal transmission of the transmitter. Thereafter, a control signal suitable for the pre-recognized information is transmitted, such that SU-MIMO transmission and MU-MIMO transmission can be simultaneously supported.

On the other hand, the transmitter does not provide indication messages of the SU-MIMO transmission mode and the MU-MIMO transmission mode to the receiver, such that the transmitter may allow the receiver to recognize any one of the two transmission modes and decode corresponding data. In this case, the transmitter may inform the receiver of the number of layers that must be received by a current UE. In this case, it is impossible for the UE to identify the SU-MIMO mode and the MU-MIMO mode. Therefore, it is possible to support MIMO transmission using the same control signal. However, there is a need for the receiver to report different feedback information to the transmitter so as to support SU-MIMO and MU-MIMO. For example, in order to support SU-MIMO transmission, a transmission rank most appropriate for transmission may be reported in consideration of a maximum number of spatial channels capable of being generated in the transmitter. To support MU-MIMO transmission, a rank most appropriate for transmission may be selected and reported from among the restricted ranks in consideration of reception of a limited number of layers from the viewpoint of the receiver.

Configuration of Feedback Information for Multiple MIMO Transmission Modes

To effectively support multiple MIMO transmission modes of MU-MIMO and SU-MIMO, it is necessary to transmit feedback information suitable for each transmission mode. The 3GPP LTE Release-8 system defines RI, PMI, CQI, etc. as feedback information types. Each piece of information may be reported, taking into account the frequency-selective and time-selective characteristics of a channel. Information common to a defined system bandwidth may be defined as Wide-Band WB information and information applied to a narrow band divided from the system bandwidth may be defined as Sub-Band (SB) information. The feedback amount of WB information is smallest because the WB information is a representative value for the system bandwidth, whereas the feedback amount of SB information increases as the number of narrow bands increases because the system bandwidth is divided into narrow bands. However, SB information advantageously increases transmission performance because it is suitable for each narrow band.

Each piece of feedback information (RI, PMI, and CQI) may be estimated and/or reported as WB information or SB information.

There is little difference between rank information calculated for a WB and rank information calculated for each SB because an RI depends on channel quality state (geometry). Therefore, an RI may be set so that the same rank is used within a system bandwidth, thereby reducing the amount of feedback information remarkably.

A PMI depends on a rank. Once a transmission rank is determined, a predefined PMI is selected according to the transmission rank. A WB PMI or SB PMIs may be used according to a spatial correlation between channels. For example, if the spatial correlation between Tx antennas is high, similar PMIs are selected for almost all bands of a system bandwidth. On the contrary, if the spatial correlation between Tx antennas is low, transmission throughput can be increased by using different PMIs for different SBs. Accordingly, a WB and SBs may be defined for PMI transmission and a WB PMI and SB PMIs may be selectively used according to system characteristics.

A CQI depends on a PMI. Once a PMI is determined, a CQI is calculated to reflect a channel state changed by the determined PMI. CQIs may also be defined for a WB and SBs. In case of a WB PMI, a WB CQI or per-SB CQIs may be calculated. In case of SB PMIs, SB CQIs are calculated according to the SB PMIs. In addition, SB PMIs or a WB CQI may be defined in order to support TDM transmission.

The amount of feedback information may be determined according to the capacity of a transmission channel. With reference to [Table 5] again, the feedback modes, Modes 1-0, 1-1, 2-0, and 2-1 according to PUCCH-using CQI/PMI feedback types as defined in the 3GPP LTE Release-8 system will be described below.

PUCCH feedback is characterized in that a WB PMI is defined as a PMI and a WB CQI or SB CQIs are defined as a CQI. From the perspective of transmission time, an RI is reported first, followed by the WB PMI or the WB CQI and then the SB CQIs. The SB CQIs are calculated based on the earlier reported WB PMI.

The RI may be 1 or 2 bits long. The bit size of an RI may be determined according to an antenna configuration. For example, for a 2×2 (2 Tx and 2 Rx antennas) or 4×2 (4 Tx antennas and 2 Rx antennas) antenna configuration, up to rank-2 transmission is possible. Thus, 1 bit is required for the RI. For a 4×4 antenna configuration, up to rank-4 transmission is possible and thus 2 bits are required for the RI.

A PMI may be 1, 2 or 4 bits long according to an antenna configuration and a transmission rank. For example, the PMI needs 2 bits for 2 Tx antennas and rank 1, 1 bit for 2 Tx antennas and rank 2, and 4 bits for 4 Tx antennas and rank 1 to rank 4.

In regards to CQIs, 4 bits are needed for a WB CQI in case of 1-layer transmission, 7 bits for a WB CQI in case of 2 or more-layer transmission, 4+L bits for an SB CQI in case of 1-layer transmission, and 7+L bits for an SB CQI in case of 2 or more-layer transmission. Herein, L denotes bits for a Best-1 indicator.

As described before, the 3GPP LTE Release-8 system defines four CQI/PMI/RI feedback types for PUCCH reporting modes.

In Type 1 for a CQI feedback for a UE-selected SB, the bit size may be 4+L bits (SB CQIs and one layer) or 7+L bits (SB CQIs and 2 or more layers).

In Type 2 for a WB CQI feedback and a WB PMI feedback, the bit size may be 6 bits (=4 bits (CQI: 1 CW)+2 bits (PMI: 2 Tx antennas and rank 1), 8 bits (=7 bits (CQI: 2 CWs)+1 bit (2 Tx antennas and rank 1), 8 bits (=4 bits (CQI: 1 CW)+8 bits (4 Tx antennas and rank 1), or 11 bits (=7 bits (CQI: 2 CWs)+4 bits (4 Tx antennas and rank 2 to rank 4).

In Type 3 for an RI feedback, the bit size may be 1 bit (a 2×2 or 4×2 antenna configuration) or 2 bits (a 4×4 antenna configuration).

In Type 4 for a WB CQI feedback, the bit size may be 4 bits (1 CW) or 7 bits (2 CWs).

The above-described feedback information for MIMO transmission is defined for a system with 4 Tx antennas. For a system having an extended antenna configuration such as a 3GPP LTE-A system, new feedback information needs to be defined in order to support MU-MIMO and SU-MIMO transmission.

Methods for Transmitting Feedback Information in System Supporting Extended Antenna Configuration Now, a description will be given of methods for transmitting new feedback information required for a system having an extended antenna configuration according to various embodiments of the present invention.

In MU-MIMO, up to 2 layers may be received from the viewpoint of one receiver (user). This means that a rank may be 1 or 2 and thus 1-bit signaling is required to indicate rank information. Accordingly, a PMI for rank 1 or rank 2 should be selected and a CQI for transmission of 1 CW or 2 CWs should be reported. Based on the idea that MU-MIMO transmission is suitable for a highly correlated channel, use of a WB PMI as a PMI may be considered. Hence, feedback information for MU-MIMO may be reported in a PUCCH feedback reporting mode for which WB PMI transmission is defined.

First of all, a method for reporting feedback information on a PUCCH will be described.

A PUCCH may deliver feedback information for a limited-rank transmission. In case of PUCCH feedback, it may be regulated that rank 1 or rank 2, or rank 1 to rank 8 is indicated. For PUCCH feedback, it may be regulated that a WB PMI and WB and SB CQIs or a WB CQI are reported. Specific feedback information configurations may be described sequentially in the order of RI, PMI, and CQI.

An RI uses 1-bit signaling to indicate rank 1 or rank 2.

Regarding a PMI, a WB PMI may be applied and a PMI for rank 1 or rank 2 may be selected.

For rank 1, a PMI may be determined using a precoding matrix defined for 2, 4, or 8Tx transmission. To increase transmission efficiency, a whole precoding matrix set defined for rank-1 transmission set may be used. Or to reduce the amount of feedback information, a subset of a defined matrix may be used. For example, in the case where a 4Tx codebook and a 2Tx codebook are used to generate an 8Tx codebook, the 8Tx codebook may be built by searching for appropriate codebook elements in the 4Tx codebook set, while the 2Tx codebook is fixed to some codebook elements. In another example, an 8Tx codebook may be built with a subset of a 2Tx codebook and/or a subset of a 4Tx codebook. Herein, the 2Tx codebook may be configured in BPSK and a subset may be made from a 4Tx codebook set. In a further example, a subset of an 8Tx codebook may be defined for 4 or fewer-bit PMI transmission.

For rank 2, a PMI may be determined using a precoding matrix defined for 2, 4, or 8Tx transmission. To increase transmission efficiency, a whole precoding matrix set defined for rank-2 transmission set may be used. Or to reduce the amount of feedback information, a subset of a predefined matrix may be used. For example, in the case where a 4Tx codebook and a 2Tx codebook are used to generate an 8Tx codebook, the 8Tx codebook may be built by searching for appropriate codebook elements in the 4Tx codebook set, while the 2Tx codebook is fixed to some codebook elements. In another example, an 8Tx codebook may be built with a subset of a 2Tx codebook and/or a subset of a 4Tx codebook. Herein, the 2Tx codebook may be configured in BPSK and a subset may be made from a 4Tx codebook set. In a further example, a subset of an 8Tx codebook may be defined for 4 or fewer-bit PMI transmission.

In the above examples of a PMI, a defined codebook may still be used as a rank-1 codebook and a limited subset of the defined codebook may be used as a rank-2 codebook. For example, the rank-1 codebook may be 6 bits and the rank-2 codebook may be 4 bits.

When an 8Tx codebook is built by combining any two codebooks in the above examples of a PMI, a frequency granularity to which the two codebooks are applied is a system bandwidth (i.e. a WB).

As to CQIs, a WB CQI and SB CQIs or only a WB CQI may be transmitted. The WB CQI is transmitted at a transmission time point of a WB PMI. The SB CQIs are transmitted at a different time point from the WB CQI. Herein, a CQI or CQIs are calculated based on a previous reported WB PMI. CQI calculation will be described in greater detail.

On the assumption that the number of transmitted layers is larger than that of layers received at a receiver, a CQI may be calculated. For example, if the receiver receives one or two layers, up to 4 layers may be transmitted simultaneously. Then the receiver calculates a CQI, assuming that up to 4 layers including layers to be received are transmitted simultaneously and reports the CQI to a transmitter. The receiver may apply PMIs having orthogonal performance with respect to a PMI having the largest throughput.

In addition, the CQI may be calculated according to a transmission rank that offers the largest throughput to the receiver. For example, if the receiver selects rank 1, determining that reception of a rank-1 transmission signal offers the largest throughput, it may select a PMI suitable for rank-1 transmission, calculate a CQI based on the selected PMI, and report the CQI to the transmitter. Therefore, the transmitter may control transmission power appropriately according to the number of layers combined for MU-MIMO transmission. The controlled transmission power may be applied to a data channel and an RS.

Methods for reporting feedback information on a PUSCH will be described below.

An RI may occupy 1 bit to indicate up to rank 2 for a 2×2, 4×2, or 8×2 antenna configuration, 2 bits to indicate up to rank 4 for a 4×4 or 8×4 antenna configuration, and 3 bits to indicate up to rank 8 for an 8×8 antenna configuration.

N bits may be used for a PMI. When a PMI is selected from a codebook, the codebook may be a combination of any two codebooks. In this case, the frequency granularity of the codebook may be a WB or an SB and a WB PMI and SB PMIs may be selected accordingly. When one codebook is configured by combining two precoders, the resulting new precoder may be applied to an SB. In addition, if an SB is selected from among total SBs and feedback information is reported for the selected SB in order to reduce the amount of the feedback information, a predefined precoder may be applied to a non-selected SB. A set of precoding codebooks may be defined according to a transmission rank. The size and number of SBs may be determined according to a system bandwidth.

A CQI may occupy K bits. A WB CQI and SB CQIs may be calculated based on a determined PMI. In case of a WB CQI, once a precoder is determined according to a WB PMI and SB PMIs applied to respective SBs, a channel state representative of a system bandwidth is calculated by reflecting a channel changed by the determined precoder. In case of SB CQIs, once a precoder is determined according to a WB PMI and SB PMIs applied to certain SBs, indexes indicating the channel states of the SBs are selected to reflect channels changed by the determined precoder. CQIs for all SBs or selected SBs may be reported according to the above calculation result.

As described before, feedback information for limited-rank transmission may be reported on a PUCCH and feedback information for all-rank transmission may be reported on a PUSCH. For example, feedback information for up to rank 4 may be reported on a PUCCH and feedback information for up to rank 8 may be reported on a PUSCH.

If up to rank-2 transmission is possible, feedback information for rank-1 or rank-2 transmission may be reported on the PUCCH or PUSCH. The property of feedback information reported on the PUCCH may be different from that of feedback information reported on the PUSCH, as described before. A PUCCH reporting mode or a PUSCH reporting mode may be indicated by higher-layer signaling.

If up to rank-4 transmission is possible, feedback information for rank-1 and rank-2 transmissions may be reported on the PUCCH and feedback information for rank-1 to rank-4 transmissions may be reported on the PUSCH. The property of feedback information reported on the PUCCH may be different from that of feedback information reported on the PUSCH (e.g. in terms of calculation scheme, size, etc.), as described before. The PUCCH reporting mode or the PUSCH reporting mode may be indicated by higher-layer signaling.

If up to rank-4 transmission is possible, feedback information for rank-1 to rank-4 transmissions may be reported on the PUCCH or the PUSCH. The property of feedback information reported on the PUCCH may be different from that of feedback information reported on the PUSCH (e.g. in terms of calculation scheme, size, etc.), as described before. The PUCCH reporting mode or the PUSCH reporting mode may be indicated by higher-layer signaling.

If up to rank-8 transmission is possible, feedback information for rank-1 and rank-2 transmissions may be reported on the PUCCH and feedback information for rank-1 to rank-8 transmissions may be reported on the PUSCH. The property of feedback information reported on the PUCCH may be different from that of feedback information reported on the PUSCH (e.g. in terms of calculation scheme, size, etc.), as described before. The PUCCH reporting mode or the PUSCH reporting mode may be indicated by higher-layer signaling.

If up to rank-8 transmission is possible, feedback information for rank-1 to rank-4 transmissions may be reported on the PUCCH and feedback information for rank-1 to rank-8 transmissions may be reported on the PUSCH. The property of feedback information reported on the PUCCH may be different from that of feedback information reported on the PUSCH (e.g. in terms of calculation scheme, size, etc.), as described before. The PUCCH reporting mode or the PUSCH reporting mode may be indicated by higher-layer signaling.

CQI Feedback for MU-MIMO Transmission

To increase the average throughput of a cell, a multi-antenna system may support multiple users spatially. For example, a 4Tx system may transmit up to 4 independent data streams to each user. A transmitter transmits data in multiple layers (or streams) but a receiver may perceive that it receives a single layer or a part of multiple layers.

In addition, link adaptation is available to increase the efficiency of data transmission. For link adaptation, the receiver measures a channel state and reports a CQI to the transmitter. In general, the receiver measures the CQI based on the number of received layers. For example, the receiver receives one layer from an eNB and calculates a CQI on the assumption of rank 1-transmission in SU-MIMO rank-1 transmission. In this case, the receiver calculates and reports a CQI optimized for rank 1. On the other hand, even though the receiver receives one layer in MU-MIMO transmission, the transmitter may transmit multiple layers. In addition, only when the transmission power of each layer is decreased and an SINR is calculated taking into account interference between layers, an appropriate MCS can be selected for multi-layer transmission. In the case where the receiver measures and reports an SINR on the assumption of an interference-free situation for SU-MIMO rank-1 transmission (e.g. maximal-ratio combining (MRC)), the transmitter selects an inappropriate MCS for MU-MIMO. To avert this problem, a UE may measure an SINR on the assumption of multi-layer transmission.

For instance, when N layers are multiplexed and transmitted, the receiver may measure an SINR on the assumption that N layers are received. Although the receiver knows a precoding vector (or a precoding matrix) used for the received layers, it has no knowledge of a precoding vector (or a precoding matrix) used for non-received layers. In this case, the receiver may search for a vector (or a matrix) orthogonal to a precoding vector (or a precoding matrix) recommended for data transmission of the receiver and then may calculate an SINR on the assumption that data is transmitted using a vector (or a matrix) other than a precoding vector (or matrix) for signaling.

In addition, downlink MU-MIMO and SU-MIMO transmission may be designed in such a manner that it is perceived as SU-MIMO transmission to the receiver. To support this design, different CQIs for MU-MIMO and SU-MIMO may be reported. In contrast, in order to reduce the overhead of CQI reporting, either a CQI for SU-MIMO or a CQI for MU-MIMO may be reported and SU-MIMO or MU-MIMO transmission may be attempted using the reported CQI. A CQI calculated on the assumption of the absence of an interfering layer and a CQI calculated on the assumption of the presence of an interfering layer may be referred to as an optimistic CQI and a pessimistic CQI, respectively. In general, the optimistic CQI is more suitable for SU-MIMO transmission than the pessimistic CQI, whereas the pessimistic CQI outperforms the optimistic CQI in MU-MIMO transmission. Nonetheless, use of the pessimistic CQI for SU-MIMO transmission does not degrade SU-MIMO performance much. Therefore, if a CQI is to be transmitted to support SU-MIMO and MU-MIMO simultaneously, it is preferable to report a pessimistic CQI (i.e. a CQI calculated on the assumption of the presence of an interfering layer).

[Table 11] illustrates performance according to CQI properties in MU-MIMO transmission.

TABLE 11

|       | SU only   | Reference Rank |
|-------|-----------|----------------|
| R-8   | 1.91E+04  | 2.01E+04       |
| R-8 + R | 2.00E+04 | 2.11E+04       |

In [Table 11], SU only and Reference Rank indicate CQI properties. SU only indicates optimistic CQI and Reference Rank indicates pessimistic CQI. R-8 and R-8+R indicate precoders used for transmission. R-8 indicates a precoder defined in 3GPP LTE Release-8 and R-8+R indicates use of a codebook and covariance matrix defined in 3GPP LTE Release-8. As noted from [Table 11], the pessimistic CQI guarantees a gain of about 5% in MU-MIMO transmission, compared to the optimistic CQI.

Optimistic CQI-only transmission, pessimistic CQI-only transmission, and optimistic and pessimistic CQIs transmission may be considered depending on CQI types.

In the optimistic CQI-only transmission scheme, a CQI may be calculated and reported on the assumption that no interfering layer exists for any transmission rank. In the pessimistic CQI-only transmission scheme, a CQI may be calculated on the assumption that the maximum number of layers for MU-MIMO is N.

The optimistic and pessimistic CQIs transmission scheme will be described below in detail.

A CQI may be calculated and reported on the assumption of the presence or absence of an interfering layer (i.e. a pessimistic CQI or an optimistic CQI) according to a recommended rank. For example, a pessimistic CQI may be calculated for up to rank 2, MU-MIMO transmission of up to 4 layers may be assumed to calculate the pessimistic CQI, and an optimistic CQI may be calculated for a rank higher than 2. In another example, a pessimistic CQI may be calculated for up to rank 1, MU-MIMO transmission of up to 4 layers may be assumed to calculate the pessimistic CQI, and an optimistic CQI may be calculated for a rank higher than 1. In another example, a pessimistic CQI may be calculated for up to rank 2, MU-MIMO transmission of up to 4 layers may be assumed to calculate the pessimistic CQI, and an optimistic CQI may be calculated for every rank. In a further example, a pessimistic CQI may be calculated for up to rank 1, MU-MIMO transmission of up to 4 layers may be assumed to calculate the pessimistic CQI, and an optimistic CQI may be calculated for every rank.

Or both optimistic and pessimistic CQIs for a specific rank may be reported. For instance, optimistic and pessimistic CQIs may be reported for rank 1 and rank 2, and only an optimistic CQI may be reported for a rank higher than 2. In another example, optimistic and pessimistic CQIs may be reported for rank 1, and only an optimistic CQI may be reported for a rank higher than 1. In another example, a difference from a pessimistic CQI, i.e. a Δ (delta) CQI may be used in order to reduce feedback overhead (e.g. when an optimistic CQI is transmitted in 4 bits, a corresponding pessimistic CQI may be represented in 2 or 3 bits). In a further example, a pessimistic CQI may be reported in a long term (i.e. less often), whereas an optimistic CQI may be reported in a short term (i.e. more often) to reduce feedback overhead.

Or one of optimistic and pessimistic CQIs may be reported according to a recommended rank. For example, only a pessimistic CQI may be reported for up to rank 2, whereas only an optimistic CQI may be reported for a rank higher than 2. In another example, only a pessimistic CQI may be reported for up to rank 1, whereas only an optimistic CQI may be reported for a rank higher than 1.

Or a CQI may be calculated and reported on the assumption of the presence or absence of an interfering layer (i.e. a pessimistic CQI or an optimistic CQI) according to the number of Tx antennas.

In case of 2 Tx antennas, an optimistic CQI may be calculated.

For 4 or 8 Tx antennas, optimistic and pessimistic CQIs may be calculated. For instance, a pessimistic CQI may be calculated according to a recommended rank. Or, a pessimistic CQI may be reported instead of an optimistic CQI. Or when an optimistic CQI is reported, an additional CQI (it may be a pessimistic CQI) may be reported.

Precoder for 8 Tx Antennas

A system having an extended antenna configuration (e.g. a 3GPP LTE Release-10 system) may perform MIMO transmission, for example, through 8 Tx antennas. Thus a codebook for supporting 8Tx MIMO transmission needs to be designed.

To report CSI regarding channels transmitted through 8 antenna ports, codebooks illustrated in [Table 12] to [Table 18] may be used. 8 CSI antenna ports may be labeled with antenna port 15 to antenna port 22. [Table 12] illustrates an exemplary codebook for a 1-layer CSI report using antenna port 15 to antenna port 22. [Table 13] illustrates an exemplary codebook for a 2-layer CSI report using antenna port 15 to antenna port 22. [Table 13] illustrates an exemplary codebook for a 3-layer CSI report using antenna port 15 to antenna port 22. [Table 15] illustrates an exemplary codebook for a 4-layer CSI report using antenna port 15 to antenna port 22. [Table 16] illustrates an exemplary codebook for a 5-layer CSI report using antenna port 15 to antenna port 22. [Table 17] illustrates an exemplary codebook for a 6-layer CSI report using antenna port 15 to antenna port 22. [Table 18] illustrates an exemplary codebook for a 7-layer CSI report using antenna port 15 to antenna port 22. [Table 19] illustrates an exemplary codebook for an 8-layer CSI report using antenna port 15 to antenna port 22.

In [Table 12] to [Table 19], $\phi_n$ and $v_m$ may be given as [Equation 17].

$$\phi_n = e^{j\pi n/2}$$

$$v_m = [1\ e^{j2\pi m/32}\ e^{j4\pi m/32}\ e^{j\pi m/32}]^T \quad \text{[Equation 17]}$$

TABLE 12

| $i_1$ | $i_2$ | | | | | | | |
|---|---|---|---|---|---|---|---|---|
| | 0 | 1 | 2 | 3 | 4 | 5 | 6 | 7 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |
| | $i_2$ | | | | | | | |
| $i_1$ | 8 | 9 | 10 | 11 | 12 | 13 | 14 | 15 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where $$W^{(1)}_{m,n} = \frac{1}{\sqrt{8}} \begin{bmatrix} v_m \\ \varphi_n v_m \end{bmatrix}$$

TABLE 13

| $i_1$ | $i_2$ | | | |
|---|---|---|---|---|
| | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1,0}$ | $W^{(2)}_{2i_1+1,2i_1+1,1}$ |
| | $i_2$ | | | |
| $i_1$ | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |

TABLE 13-continued

| $i_1$ | $i_2$ | | | |
|---|---|---|---|---|
| | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |
| | $i_2$ | | | |
| $i_1$ | 12 | 13 | 14 | 15 |
| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where $$W^{(2)}_{m,m',n} = \frac{1}{4} \begin{bmatrix} v_m & v_{m'} \\ \varphi_n v_m & -\varphi_n v_{m'} \end{bmatrix}$$

TABLE 14

| $i_1$ | $i_2$ | | | |
|---|---|---|---|---|
| | 0 | 1 | 2 | 3 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_2+8,8i_1+8}$ | $\tilde{W}^{(3)}_{8i_1+8,8i_1,8i_1}$ |
| | $i_2$ | | | |
| $i_1$ | 4 | 5 | 6 | 7 |
| 0-3 | $W^{(3)}_{8i_1+2,8i_1+2,4i_1+10}$ | $W^{(3)}_{8i_1+10,8i_1+2,8i_1+10}$ | $\tilde{W}^{(3)}_{8i_1+2,8i_1+10,8i_1+10}$ | $\tilde{W}^{(3)}_{8i_1+10,8i_1+2,8i_1+2}$ |
| | $i_2$ | | | |
| $i_1$ | 8 | 9 | 10 | 11 |
| 0-3 | $W^{(3)}_{8i_1+4,8i_1+4,8i_1+12}$ | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |
| | $i_2$ | | | |
| $i_1$ | 12 | 13 | 14 | 15 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ | $\tilde{W}^{(3)}_{8i_1+14,8i_1+6,8i_1+6}$ | where $$W^{(3)}_{m,m',m''} = \frac{1}{\sqrt{24}} \begin{bmatrix} v_m & v_{m'} & v_{m''} \\ v_m & -v_{m'} & -v_{m''} \end{bmatrix}, \quad \tilde{W}^{(3)}_{m,m',m''} = \frac{1}{\sqrt{24}} \begin{bmatrix} v_m & v_{m'} & v_{m''} \\ v_m & v_{m'} & -v_{m''} \end{bmatrix}$$

TABLE 15

| $i_1$ | $i_2$ | | | |
|---|---|---|---|---|
| | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| $i_1$ | $i_2$ | | | |
|---|---|---|---|---|
| | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ | where $$W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$$

TABLE 16

| $i_1$ | $i_2$ |
|---|---|
| | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 17

| $i_1$ | $i_2$ |
|---|---|
| | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 18

| $i_1$ | $i_2$ |
|---|---|
| | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 19

| $i_1$ | $i_2$ |
|---|---|
| | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Transmission of Feedback Information on PUCCH

Feedback information that a receiver transmits to a transmitter for reliable MIMO transmission may include an RI, a PMI, a CQI, an ACK/NACK, an SR, etc. An RI, a PMI, a CQI, etc. may be used as channel information for data transmission.

To feedback channel information in a system supporting extended multi-antenna transmission, a feedback information reporting scheme may be configured based on feedback modes defined in the legacy 3GPP LTE Release-8 system (e.g. the feedback modes described before in relation to [Table 5]). First of all, conventional feedback modes will be described in brief.

The properties of reported feedback information may be classified into short term and long term in terms of time and SB and WB in terms of frequency. Specifically, an RI is long-term WB information. A PMI indicating a precoding matrix that represents the long-term covariance of a channel is long-term WB information and a PMI reported in a short term is short-term WB or short-term SB information. A CQI may be reported more often than an RI and may be classified as an SB CQI or a WB CQI according to a reported frequency granularity.

In the 3GPP LTE Release-8 system, channel information may be transmitted according to transmission time points as illustrated in [Table 20].

TABLE 20

| | T_1 | T_2 | T_3~T_N |
|---|---|---|---|
| Mode 1-0 | RI | Wideband CQI | |
| Mode 2-0 | RI | Wideband CQI | Best-1 CQI in each BP |
| Mode 1-1 | RI | Wideband CQI Wideband PMI | |
| Mode 2-1 | RI | Wideband CQI Wideband PMI | Best-1 CQ1 in each BP |

In Mode 1-0, an RI is reported in an uplink subframe T_1 and then a WB CQI is reported in another uplink subframe T_2. The RI and the WB CQI are reported periodically and the reporting period of the RI is a multiple of that of the WB CQI. A specific offset may be set between the subframe T_1 carrying the RI and the subframe T_2 carrying the WB CQI and the offset may be 0 at minimum. In Mode 2-0, SB CQI transmission is added to Mode 1-0. An SB is selected from a specific BP and a CQI for the selected SB is reported as an SB CQI. Mode 1-1 and Mode 2-1 are cases where PMI transmission is added to Mode 1-0 and Mode 2-0, respectively. The PMI is a WB PMI which is transmitted along with a WB CQI.

The system supporting an extended antenna configuration (e.g. the 3GPP LTE-A system) may use different precoding matrices in configuring precoding weights. As the receiver reports an index indicating each precoding matrix, the transmitter may configure a precoding weight for a channel. For example, to configure a feedback codebook including two different precoding matrices, indexes included in the respective precoding matrices may be reported. The indexes may be referred to as PMI_1 and PMI_2, respectively. PMI_1 may be a precoding weight reflecting long-term fading and PMI_2 may be a precoding weight reflecting short-term fading. For example, PMI_1 indicating a long-term covariance matrix like a channel covariance matrix may be reported less frequently and may be expressed as a value that does not substantially change (an almost same value) in a WB. Accordingly, PMI_1 may be reported in the same period as that of an RI. On the other hand, PMI_2 reflecting short-term fading is reported more frequently. If PMI_2 applies to a WB, it may be reported in a similar period to that of a WB CQI. If PMI_2 applies to an SB, it may be reported at a reporting position of each SB CQI.

Reported PMI and CQI information may have different values according to a rank. If the size of each piece of the PMI and CQI information is known, the number of decodings may be reduced, thereby increasing system performance. Therefore, if a time or frequency is allocated for transmitting an RI on an uplink transmission channel, information for decoding PMI and CQI information may be acquired after RI information is first interpreted. Therefore, PMI_1 reported in a long term is preferably transmitted at a different time point or in a different frequency from an RI.

Now, specific examples of feedback information transmission timing according to the present invention will be described.

In an example, PMI_1 may be a WB PMI and transmitted in the same period as an RI. The reporting timing of PMI_1 may have a specific offset with respect to that of an RI. The offset may be 1 at minimum. That is, PMI_1 may be reported after the RI, rather than PMI_1 and the RI are transmitted simultaneously.

In another example, the transmission period of PMI_1 may be set to be shorter than that of the RI and longer than PMI_2. That is, PMI_1 is transmitted more frequently than the RI and less frequently than PMI_2.

In a third example, PMI_1 and the RI may be transmitted together. In this case, the RI and PMI_1 are separately encoded.

In a fourth example, when PMI_1 and the RI are separately encoded, different coding schemes may be used according to the amount of information. For example, if 1 or 2 bits are required to carry information included in PMI_1 or the RI, a conventional coding scheme used for ACK/NACK transmission may be adopted. If 3 to 13 bits are required, a conventional coding scheme used for CQI transmission may be used.

In a fifth example, PMI_2 and the WB CQI may be transmitted together. In this case, PMI_2 may be a value reflecting a WB. Then feedback information may be transmitted at transmission timings illustrated in [Table 21]. In [Table 20], an RI is transmitted at time T_1, followed by WB PMI_1 at time T_2 and then both a WB CQI and WB PMI_2 at time T_3 in Mode 1-2. In [Table 21], Mode 2-2 is defined by adding SB CQI transmission to Mode 2-1.

TABLE 21

|  | T_1 | T_2 | T_3 | T_4~T_N |
|---|---|---|---|---|
| Mode 1-2 | RI | Wideband PMI_1 | Wideband CQI Wideband PMI_2 | |
| Mode 2-2 | RI | Wideband PMI_1 | Wideband CQI Wideband PMI_2 | Best-1 CQI in each BP |

In a sixth example, a CQI may be reported by applying a predetermined PMI (i.e. a PMI preset between a transmitter and a receiver). As a consequence, the amount of feedback information may be decreased. For example, a preset PMI may be used as PMI_2 and the receiver may not feedback PMI_2 separately. Herein, different PMI_2 values may be used on an arbitrary SB basis.

In a seventh example, PMI_1 may be represented in N bits and PMI_2 may be represented in M bits (M<N), when feedback information is configured. The amount of the feedback information may vary with a rank. For example, PMI_1 and PMI_2 may be 4 bits and 3 bits respectively, for rank-1 transmission. For transmission with a rank higher than 1, PMI_1 may be represented in fewer than 4 bits and PMI_2 may be represented in fewer than 3 bits.

In an eighth example, when PMI_1 is expressed in fewer than 4 bits, a channel coding scheme used for CQI coding may be applied to PMI_1.

Meanwhile, specific examples of transmitting PMI_1 and a WB CQI together according to the present invention will be described.

In an example, it is assumed that PMI_1 is WB information and PMI_1 and a WB CQI are transmitted simultaneously at a transmitting timing of PMI_1. A PMI should be determined to calculate a CQI and the PMI is determined by PMI_1 and PMI_2. Here, PMI_1 may be set to a value transmitted along with the WB CQI and PMI_2 may be a preset value. PMI_2 may be information preset on an arbitrary SB basis or on a WB basis. A new PMI may be set using the preset PMI_2 and the selected PMI_1 and the WB CQI may be calculated based on channel information changed by applying the new PMI.

In another example, after PMI_1 and the WB CQI are reported, an SB CQI may be reported. The SB CQI may be calculated based on the preset PMI_2. In addition, one CQI may be reported for each BP.

In a third example, after PMI_1 and the WB CQI are reported, the SB CQI and PMI_2 may be reported.

Referring to [Table 22], a case where WB PMI_1 and SB PMI_2 are transmitted will be described as a more specific example. In [Table 22], Mode 2-2 is a modification example of Mode 2-2 described in [Table 21].

TABLE 22

|  | T_1 | T_2 | T_3 |
|---|---|---|---|
| Mode 2-2 | RI | Wideband PMI_1 Wideband CQI | Best-1 CQI in each BP Subband PMI_2 |

As described before, a precoding weight may be a combination of PMI_1 and PMI_2. Herein, PMI_1 and PMI_2 are applied to a WB and an SB, respectively. Especially, PMI_2 may be defined as a precoding weight suitable for a BP. A WB may include one or more BPs and a BP may include one or more SBs.

In accordance with an embodiment of the present invention, an RI, WB PMI_1/a WB CQI, and an SB CQI/SB PMI_2 may be transmitted at different time points. As illustrated in [Table 22], the RI may be transmitted at time T_1, WB PMI_1 and/or the WB CQI at time T_2, and the SB CQI and/or SB PMI_2 at time T_3. The SB CQI is a CQI for an optimum SB (Best-1) selected from a BP. SM PMI_2 is a PMI applied to a BP. The WB CQI may be defined as a value calculated based on a PMI composed of WB PMI_1 and a plurality of BP PMI_2. The SB CQI is calculated for an SB selected from a specific BP. The SB CQI may be calculated based on a PMI composed of PMI_1 applied to the WB and PMI_2 applied to the BP.

A feedback report on a PUCCH delivers limited information because the PUCCH has a narrow channel space for feedback information, compared to a PUSCH. Accordingly, W1 and W2 may not be fed back simultaneously on the PUCCH. In this case, a WB value may be reported as W2, or a fixed index (i.e. a preset value) may be used as W2.

For example, enhanced PUCCH feedback mode 1-1 may be defined by extending the conventional PUCCH feedback mode 1-1 (a mode of reporting a WB CQI and a WB PMI) in order to report a WB CQI, WB W1, and fixed W2.

In addition, enhanced PUCCH feedback mode 2-1 may be defined by extending the conventional PUCCH feedback mode 2-1 (a mode of reporting an SB CQI and band indication for an SB selected from a BP along with band cycling, while reporting a WB CQI and a WB PMI) in order to report a WB CQI, WB W1, fixed W2, an SB CQI and band indication for an SB selected from a BP with band cycling, and SB W2 for the selected band.

To obtain a WB CQI in a PUCCH feedback mode, a precoder W should be determined. When the precoder W is determined, a precoding matrix index may be selected as W1 from a codebook set and W2 may be a fixed index.

PUCCH feedback mode 2-1 may be configured by combining information reported in PUCCH feedback mode 1-1 with additional CQI/PMI information. The information reported in PUCCH feedback mode 1-1 and the additional CQI/PMI information may be transmitted at different time points (timings). The additional CQI/PMI information may be dependent on PUCCH feedback mode 1-1. That is, W1 at the timing of reporting in PUCCH feedback mode 1-1 is used as precoder information necessary to calculate the additional CQI information. If a WB CQI and WB W1 are missed, next additional CQI/PMI information may not be used. W2 that forms the additional CQI/PMI information may be determined to be a precoder for an SB selected from a BP.

Accordingly, information may be transmitted at transmission timings illustrated in [Table 23] in PUCCH feedback mode 2-1.

TABLE 23

| T1 | T2 | T3 | T4 |
|---|---|---|---|
| Rank | WB CQI<br>WB W1 | SB CQI<br>SB W2<br>Band Indication<br>in bandwidth part N | SB CQI<br>SB W2<br>Band Indication<br>in bandwidth part N + 1 |

As noted from [Table 23], rank information may be transmitted in a period being integer multiples of reporting periods of a WB CQI and SB CQIs, with specific time offsets from the reporting periods of the WB CQI and SB CQIs. If the rank information and CQI/PMI information are transmitted at the same time, the CQI/PMI information may be dropped. The WB CQI may be calculated based on WB W1 and fixed W2 (preset W2).

Transmission of Feedback Information on PUSCH

An RI and a WB CQI/WB PMI_1/an SB CQI/SB PMI_2 may be fed back on a PUSCH. Various transmission modes may be defined for feedback information transmitted on a PUSCH according to the frequency granularity and combination scheme of a transmitted CQI/PMI. Hereinbelow, various transmission modes proposed by the present invention, Mode 1-1, Mode 1-2, Mode 1-3, Mode 2-2-1, Mode 2-2-2, Mode 2-3, Mode 3-1, and Mode 3-2 will be described.

In Mode 1-1, a WB CQI for a first CW, a WB CQI for a second CW, WB PMI_1, and WB PMI_2 are transmitted. The WB CQI for the first CW may be expressed as a specific value quantized to N bits. The WB CQI for the second CW may also be expressed as a specific value quantized to N bits. For example, N may be 4.

In Mode 1-2, an RI, a WB CQI and SB CQIs for a first CW, a WB CQI and SB CQIs for a second CW, WB PMI_1, and WM PMI_2 are transmitted. The WB CQI for the first CW may be expressed as a specific value quantized to N bits. An SB CQI for the first CW may be expressed in M (M<N) bits, relative to N. The WB CQI for the second CW may also be expressed as a specific value quantized to N bits. An SB CQI for the second CW may be expressed in M (M<N) bits, relative to N. For example, N may be 4 and M may be 2. The SB CQIs are for all SBs included in a total band. For example, enhanced PUSCH feedback mode 3-1 for reporting a WB CQI, SB CQIs, WB W1, and SB W2s may be defined by applying a W1 and W2 transmission scheme to a PMI reporting scheme in the conventional PUSCH feedback mode 3-1 (a mode of reporting SB CQIs and a WB PMI).

In Mode 1-3, an RI, a WB CQI and SB CQI for a first CW, a WB CQI and SB CQI for a second CW, WB PMI_1, SB PMI_2, and the indexes of selected SBs are transmitted. The WB CQI for the first CW may be expressed as a specific value quantized to N bits. The SB CQI for the first CW may be expressed in M (M<N) bits, relative to N. The WB CQI for the second CW may also be expressed as a specific value quantized to N bits. The SB CQI for the second CW may be expressed in M (M<N) bits, relative to N. For example, N may be 4 and M may be 2. The SB CQI may be an average value of CQIs for SBs selected from all SBs included in a total band. SB PMI_2 may be a selected value suitable for SBs for which SB CQIs are calculated.

In Mode 2-2-1, an RI, a WB CQI and SB CQIs for a first CW, a WB CQI and SB CQIs for a second CW, WB PMI_1, and SB PMI_2 are transmitted. The WB CQI for the first CW may be expressed as a specific value quantized to N bits. An SB CQI for the first CW may be expressed in M (M<N) bits, relative to N. The WB CQI for the second CW may also be expressed as a specific value quantized to N bits. An SB CQI for the second CW may be expressed in M (M<N) bits, relative to N. For example, N may be 4 and M may be 2. The SB CQIs are for all SBs included in a total band. SB PMI_2 is also for all SBs included in the total band.

In Mode 2-2-2, an RI, a WB CQI and SB CQIs for a first CW, a WB CQI and SB CQIs for a second CW, WB PMI_1, and SB PMI_2 are transmitted. The WB CQI for the first CW may be expressed as a specific value quantized to N bits. An SB CQI for the first CW may be expressed in M (M<N) bits, relative to N. The WB CQI for the second CW may also be expressed as a specific value quantized to N bits. An SB CQI for the second CW may be expressed in M (M<N) bits, relative to N. For example, N may be 4 and M may be 2. The SB CQIs are for all SBs included in a total band. SB PMI_2 is also for all BPs included in the total band.

In Mode 2-3, an RI, a WB CQI and SB CQIs for a first CW, a WB CQI and SB CQIs for a second CW, WB PMI_1, SB PMI_2s, and the indexes of selected SBs are transmitted. The WB CQI for the first CW may be expressed as a specific value quantized to N bits. An SB CQI for the first CW may be expressed in M (M<N) bits, relative to N. The WB CQI for the second CW may also be expressed as a specific value quantized to N bits. An SB CQI for the second CW may be expressed in M (M<N) bits, relative to N. For example, N may be 4 and M may be 2. The SB CQIs are calculated for SBs selected from all SBs included in a total band, independently for each of the selected SBs. SB PMI_2s are selected values for SBs for which SB CQIs are calculated, independently for each of the SBs.

In another example, enhanced PUSCH feedback mode 2-2 for reporting an average CQI of selected SBs and W2 for the selected SBs may be defined by applying a W1 and W2 transmission scheme to a PMI reporting scheme in the conventional PUSCH feedback mode 2-2 (a mode of reporting a WB CQI, a WB PMI, an average CQI of selected SBs, and a PMI for the selected SBs). A WB CQI per codeword may be reported and the WB CQI may be calculated on the assumption that a single precoding matrix is used for all SBs and transmission occurs in SBs of a total system bandwidth (set S). The average CQI of the selected SBs may reflect transmission only on M selected SBs and may be reported as a CQI per codeword calculated using a selected same precoding matrix for the M SBs. WB W1, WB W2, and W2 for the selected SBs may be reported in a downlink 8Tx transmission mode in which a CSI-RS port is set (transmission mode 9). A UE reports W1 (a first PMI or i1) for all SBs of the total system bandwidth (set S), W2 (a second PMI or i1) for all SBs of the total system bandwidth (set S), and W2 (a second PMI) for M selected SBs.

In Mode 3-1, a WB CQI for a first CW, a WB CQI for a second CW, WB PMI__1, and SB PMI__2s are transmitted. Each of the WB CQI for the first CW and the WB CQI for the second CW may be expressed as a specific value quantized to N bits. For example, N may be 4. SB PMI__2s are for all SBs included in a total band. For instance, a CQI is reported for a WB and a PMI is reported for an SB in PUSCH feedback mode 1-2 defined in the 3GPP LTE Release-8 system and the PMI reporting scheme may be extended to feedback of W1 and W2. For example, enhanced PUSCH feedback mode 1-2 may be defined to report a WB CQI, WB W1, and SB W2s. One WB CQI per codeword is reported and the WB CQI is calculated on the assumption that a selected precoding matrix is used for each SB and transmission occurs in the SBs of a total system bandwidth (set S). WB W1 (a first PMI or i1) and SB W2s (second PMIs or i2s) may be reported in the downlink 8Tx transmission mode in which a CSI-RS port is set (transmission mode 9). Herein, WB W1 (the first PMI or i1) may be reported for the total system bandwidth (set S) and WB W2 (the second PMI or i2) may be reported for each SB in the total system bandwidth (set S).

In Mode 3-2, a WB CQI for a first CW, a WB CQI for a second CW, WB PMI__1, and an SB PMI__2 are transmitted. Each of the WB CQI for the first CW and the WB CQI for the second CW may be expressed as a specific value quantized to N bits. For example, N may be 4. SB PMI__2 is for all BPs included in a total band.

As described before, an RI may be separately encoded and a CQI and a PMI may be jointly encoded in the various modes for transmitting feedback information on a PUSCH. The RI and the CQI and/or the PMI may be transmitted simultaneously on the PUSCH.

In addition, the 3GPP LTE Release-8 system defines 8 feedback modes for CQI/PMI feedback. The 8 feedback modes include PUCCH feedback mode 1-0 for reporting a WB CQI, PUCCH feedback mode 1-1 for reporting a WB CQI and a WB PMI, PUCCH feedback mode 2-0 for reporting an SB CQI for an SB selected from one BP and a selected band indication along with band cycling, while reporting a WB CQI, PUCCH feedback mode 2-1 for reporting an SB CQI for an SB selected from one BP and a selected band indication along with band cycling, while reporting a WB CQI and a WB PMI, PUSCH feedback mode 1-0 for reporting a WB CQI, PUSCH feedback mode 1-2 for reporting a WB CQI and SB PMIs, PUSCH feedback mode 2-0 for reporting a WB CQI and an average CQI of selected SBs, PUSCH feedback mode 2-2 for reporting a WB CQI, a WB PMI, an average CQI of selected SBs, and a PMI for the selected SBs, PUSCH feedback mode 3-0 for reporting SB CQIs, and PUSCH feedback mode 3-1 for reporting SB CQIs and a WB PMI.

The multi-precoder reporting methods have been described above to improve feedback in the system supporting an extended antenna configuration (e.g. 3GPP LTE-A). That is, an overall precoder W may be created by combining two precoders W1 and W2. For example, a precoder may be selected by combining the indexes of W1 (or i1) and W2 (or i2) in [Table 12] to [Table 19]. Herein, W1 is long-term reported WB information and W2 is short-term reported SB information. However, W2 may be reported in a different manner depending on feedback overhead. For example, the reporting period and/or reported target (WB/SB) of W2 may be different in PUSCH feedback and PUCCH feedback.

In PUSCH feedback, W1 and W2 may be reported simultaneously because a PUSCH has a wide channel capacity for carrying feedback information, relative to a PUCCH. Both W1 and W2 may be WB information, or W1 may be WB information and W2 may be SB information.

As described before, enhanced PUSCH feedback modes 1-2, 2-2, and 3-1 may be summarized in [Table 24]

TABLE 24

| PUSCH CQI feedback Type | | PMI Feedback Type With PMI (CL) |
|---|---|---|
| | Wideband CQI | Mode 1-2: Multiple PMI<br>Wideband CQI for $1^{st}$ CW<br>Wideband CQI for $2^{nd}$ CW if RI > 1<br>Wideband W1<br>Subband W2 on each subband |
| | UE Selected | Mode 2-2: Multiple PMI<br>Wideband CQI for $1^{st}$ CW<br>CQI for $1^{st}$ CW on M subband<br>Wideband CQI for $2^{nd}$ CW if RI > 1<br>CQI for $2^{nd}$ CW on N subband if RI > 1<br>Wideband W1<br>Wideband W2<br>W2 on M subband<br>Selected subband Indicator |
| | Higher layer configured | Mode 3-1: Single PMI<br>Wideband CQI for $1^{st}$ CW if RI > 1<br>Subband CQIs for $1^{st}$ CW on each subband<br>Wideband CQI for $2^{nd}$ CW if RI > 1<br>Subband CQIs for $2^{nd}$ CW on each subband if RI > 1<br>Wideband W1<br>Wideband W2 |

As described before, periodic feedback information may be transmitted on the PUCCH, while aperiodic feedback information may be transmitted on the PUSCH. As proposed in the present invention, precoding information may be represented as a combination of PMI__1 and PMI__2. Or PMI__1 and PMI__2 may be expressed as weight matrices W1 and W2 (11 and 12), respectively. In the case where overall precoding information is configured to be a combination of two different pieces of precoding information in this manner, various transmission modes may be defined according to PMI__1 and PMI__2 transmission schemes (frequency granularities, transmission timings, etc.) in feedback transmission.

In aperiodic PUSCH transmission, one report may include both PMI__1 and PMI__2. If one of PMI__1 and PMI__2 is fixed (i.e. preset), one report may include only one of PMI__1 and PMI__2. An overall PMI is also determined to be a combination of PMI__1 and PMI__2. In addition, an RI and a CQI may be included together with PMI__1 and PMI__2 in one report.

In periodic PUCCH transmission, PMI__1 and PMI__2 may be signaled at different time points (in different subframes). In this case, PMI__2 may be for a WB or an SB. Meanwhile, a PMI may be determined in one report of a PMI (a PMI in one subframe) in periodic PUCCH transmission. In this case, one of PMI__1 and PMI__2 is fixed (preset) and thus need not be signaled. Or even though one of PMI__1 and PMI__2 is not fixed, there is no need for signaling them. In this case, an overall PMI is also determined to be a combination of PMI__1 and PMI__2. PMI__2 may be for a WB. Various PUCCH feedback transmission modes may be configured according to RI and CQI transmission schemes (frequency granularities, transmission timings, etc.) in PUCCH transmission.

Figure 22:
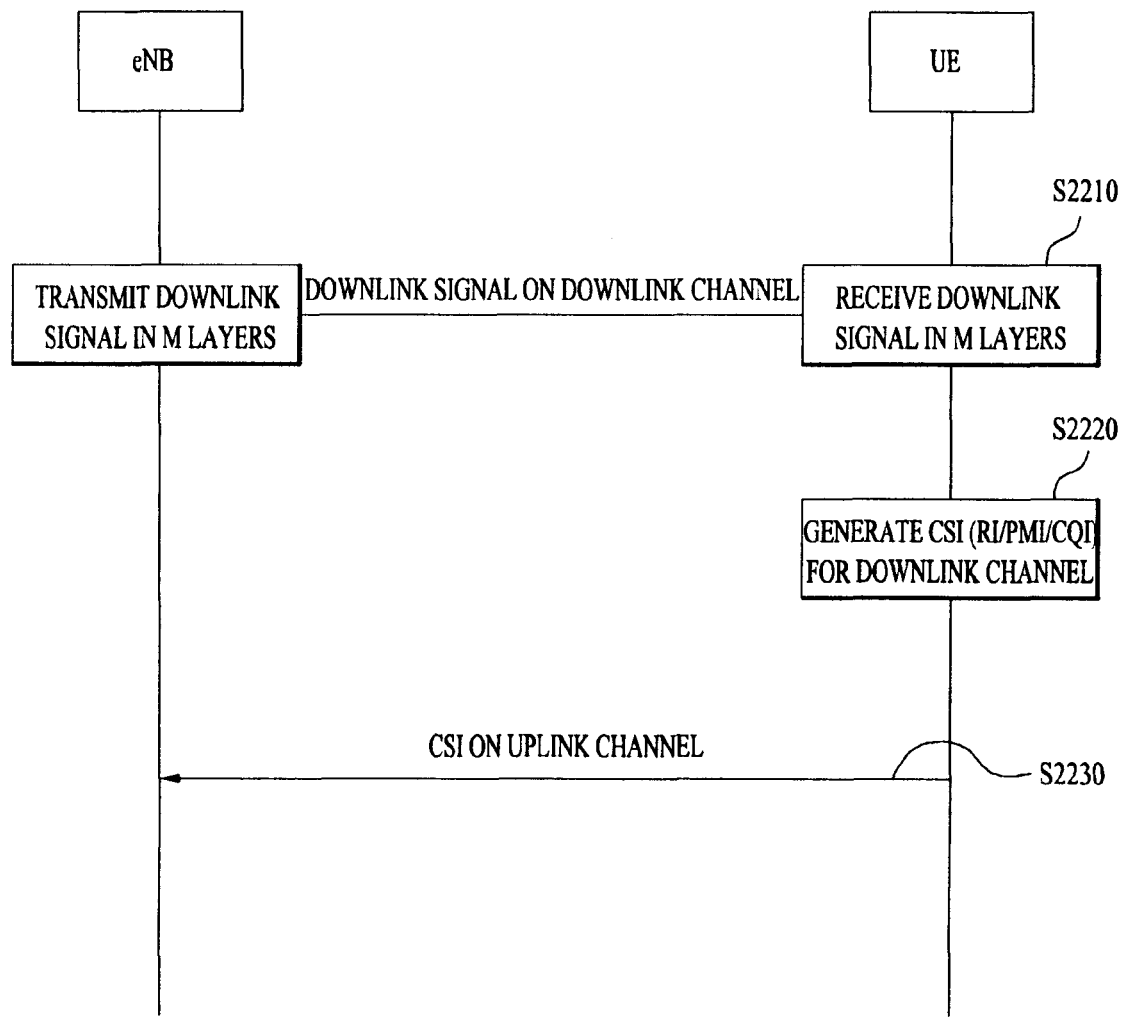
FIG. 22 is a flowchart illustrating a method for transmitting channel state information according to the present invention.

FIG 22 is a flowchart illustrating a method for transmitting CSI according to an embodiment of the present invention.

A UE may measure a downlink channel state regarding a downlink transmission from an eNB and feedback the downlink channel state measurement to the eNB on uplink. For example, when the eNB uses 8 Tx antennas for the downlink transmission, the eNB may transmit CSI-RSs through 8 antenna ports (antenna port 15 to antenna port 22). The UE may transmit the results of measuring a downlink channel state in the CSI-RSs (an RI, a PMI, a CQI, etc.). Various examples of the present invention may be applied to select and calculate an RI/PMI/CQI. The eNB may determine the number of layers, a precoder, and an MCS level for downlink transmission based on the CSI (RI/PMI/CQI) and transmit a downlink signal based on the determined information.

Referring to FIG 22, the eNB may transmit a downlink signal mapped to M layers on a downlink channel and the UE may receive a downlink signal mapped to N layers (S2210). Herein, M≥N. In SU-MIMO, for example, the eNB may transmit a downlink signal mapped to 4 transmission layers and one UE may receive the downlink signal of the 4 layers. In MU-MIMO, when the eNB transmits a downlink signal mapped to 4 transmission layers, one UE may receive a downlink signal of 2 layers.

The UE may generate an RI, first and second PMIs, and a CQI that is calculated based on precoding information determined by combining the first and second PMIs, as CSI for the downlink channel (S2220).

Herein, two types of CQIs may be generated. A first-type CQI (an optimistic CQI) is calculated based on N layers on the assumption that the downlink signal received at the UE is not interfered by the other (M−N) layers (i.e. M=N). A second-type CQI (a pessimistic CQI) is calculated on the assumption that the downlink signal received at the UE is interfered by the other (M−N) layers (i.e. M>N) and the eNB transmits a downlink signal in K layers. K may be 2 or 4. For instance, the eNB may perform MU-MIMO transmission with a total rank of 2 (in this case, each UE may receive a downlink signal with rank 1) or with a total rank of 4 (in this case, each UE may receive a downlink signal with rank 1 or rank 2). The second-type CQI may be expressed as a CQI for a limited rank of K.

A WB PMI and/or an SB PMI are related to the first-type CQI. The first-type CQI may be generated as a WB CQI and/or an SB CQI. Meanwhile, a WB PMI is related to the second-type CQI and the first-type CQI may be generated as a WB CQI.

The UE may transmit the generated CSI and the eNB may receive the CSI (S2230). The CSI may include a first-type CQI and/or a second-type CQI. CSI including the first-type CQI may be transmitted on a PUCCH or a PUSCH, whereas CSI including the second-type CQI may be transmitted on a PUCCH. The first-type CQI and/or the second-type CQI may be transmitted according to a rank. For instance, the second-type CQI may be transmitted for a rank of R or less (R=1 or 2) and the first-type CQI may be transmitted for a rank exceeding R. Or, both the first-type and second-type CQIs may be transmitted for a rank of R or less (R=1 or 2) and the first-type CQI may be transmitted for a rank exceeding R. The first-type CQI may be reported more frequently than the second-type CQI.

The descriptions of the above various embodiments of the present invention may be applied alone or in a combination of two or more in relation to the CSI transmission method of the present invention described with reference to FIG 22. A redundant description will not be provided herein, for clarity.

In addition, CSI feedback for MIMO transmission between an eNB and an RN (a backhaul uplink and a backhaul downlink) and CSI feedback for MIMO transmission between an RN and a UE (an access uplink and an access downlink) may be implemented based on the same principle of the present invention.

Figure 23:
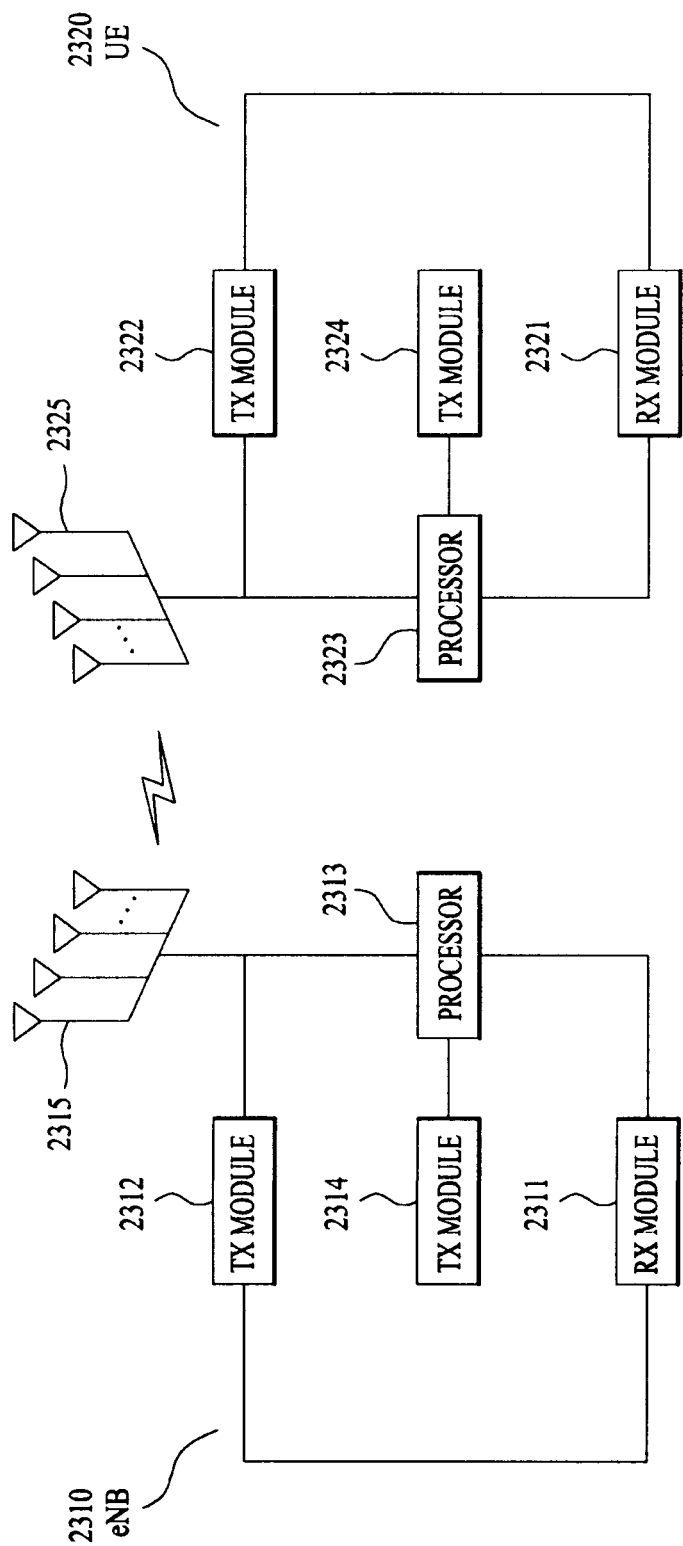
FIG. 23 is a block diagram of an eNB and a UE according to the present invention.

FIG 23 is a block diagram of an eNB and a UE according to the present invention.

Referring to FIG 23, an eNB 2310 according to the present invention may include an Rx module 2311, a Tx module 2312, a processor 2313, a memory 2314, and a plurality of antennas 2315. The existence of the plurality of antennas 2315 means that the eNB 2310 supports MIMO transmission and reception. The Rx module 2311 may receive uplink signals, data, and information from UEs. The Tx module 2312 may transmit downlink signals, data, and information to UEs. The processor 2313 may provide overall control to the eNB 2310.

In accordance with an embodiment of the present invention, the eNB 2310 may be configured so as to transmit downlink signals through up to 8 Tx antennas and receive CSI regarding a downlink transmission from a UE 2320. The processor 2313 may be configured to transmit a downlink signal on a downlink channel through the Tx module 2312. The processor 2313 may also receive on an uplink channel through the Rx module 2311 an RI, first and second PMIs, and a CQI generated based on precoding information that is determined by a combination of the first and second PMIs. The CQI may include at least one of a first-type CQI calculated based on the number of layers in which downlink signals are received, N and a second-type CQI calculated based on the number of layers in which downlink signals are transmitted, K.

Besides, the processor 2313 processes information received at the eNB 2310, information to be transmitted to the outside, etc. The memory 2314 may store the processed information for a predetermined time and may be replaced by a component like a buffer (not shown).

The UE 2320 according to the present invention may include an Rx module 2321, a Tx module 2322, a processor 2323, a memory 2324, and a plurality of antennas 2325. The existence of the plurality of antennas 2325 means that the UE 2320 supports MIMO transmission and reception. The Rx module 2321 may receive downlink signals, data, and information from an eNB. The Tx module 2322 may transmit uplink signals, data, and information to an eNB. The processor 2323 may provide overall control to the UE 2320.

In accordance with an embodiment of the present invention, the UE 2320 may be configured so as to receive downlink signals through up to 8 Tx antennas from the eNB 2310 and feedback CSI regarding the downlink transmission to the eNB 2310. The processor 2323 may be configured to receive a downlink signal on a downlink channel through the Rx module 2321. Regarding a downlink channel, the processor 2313 may also generate an RI and first and second PMIs, and generate a CQI based on precoding information that is determined by a combination of the first and second PMIs. In addition, the processor 2323 may transmit one or more of the RI, the first PMI, the second PMI, and the CQI on an uplink channel through the Tx module 2322. The CQI may include at least one of a first-type CQI calculated based on the number of layers in which downlink signals are received, N and a second-type CQI calculated based on the number of layers in which downlink signals are transmitted, K (K>N).

Besides, the processor 2323 processes information received at the UE 2320, information to be transmitted to the outside, etc. The memory 2324 may store the processed information for a predetermined time and may be replaced by a component like a buffer (not shown).

The descriptions of the foregoing various embodiments of the present invention may be applied alone or in a combination of two or more to the specific configurations of the eNB and the UE. A redundant description is not provided herein for clarity.

The description of the eNB 2310 in FIG 23 may be applied to an RN as a downlink transmission entity or an uplink reception entity, and the description of the UE 2320 in FIG 23 may be applied to an RN as a downlink reception entity or an uplink transmission entity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

Industrial Applicability

The methods for effectively reporting feedback information in a multi-antenna system according to the above-described embodiments of the present invention are applicable to various multi-antenna mobile communication systems (all mobile communication system based on multiple access schemes such as OFDMA, SC-FDMA, CDMA, TDMA etc.)

The invention claimed is:

1. A method for transmitting channel state information regarding a downlink transmission on uplink in a wireless communication system, the method performed by a user equipment (UE) and comprising:
   receiving from a base station, a downlink signal through a downlink channel;
   generating a rank indicator (RI), a first precoding matrix index (PMI), and a second PMI for the downlink channel;
   generating a first-type channel quality indicator (CQI) and a second-type CQI based on precoding information determined by a combination of the first PMI and the second PMI; and
   transmitting to the base station through an uplink channel, channel state information comprising the RI, the first PMI, the second PMI, the first-type CQI and the second-type CQI,
   wherein the first-type CQI is calculated based on the number N of layers in which the downlink signal is received at the UE and on an assumption that other M-N layers do not interfere with the downlink signal received at the UE, where M indicates the number of transmission layers of the base station,
   wherein the second-type CQI is calculated based on an assumed number K of layers in which the downlink signal is transmitted from the base station (K>N) and on an assumption that the other M-N layers interfere with the downlink signal received at the UE, and
   wherein the second-type CQI in the channel state information is transmitted in bits fewer than the first-type CQI.

2. The method according to claim 1, wherein the first-type CQI is transmitted on a physical uplink control channel (PUCCH) or a physical uplink shared channel (PUSCH), and the second-type CQI is transmitted on a PUCCH.

3. The method according to claim 1, wherein the first-type CQI includes a PMI and CQI for at least one of a wideband and a subband, and the second-type CQI includes a PMI and a CQI for a wideband.

4. The method according to claim 1, wherein the second-type CQI is transmitted for a rank of R or less (R=1 or 2) and the first-type CQI is transmitted for a rank larger than R.

5. The method according to claim 1, wherein both the first-type and second-type CQIs are transmitted for a rank of R or less (R=1 or 2) and the first-type CQI is transmitted for a rank larger than R.

6. The method according to claim 1, wherein K is 2 or 4.

7. A method for receiving channel state information regarding a downlink transmission on uplink in a wireless communication system, the method performed by a base station and comprising:
   transmitting to a user equipment (UE), a downlink signal through a downlink channel; and
   receiving from the UE through an uplink channel, channel state information comprising a rank indicator (RI), a first precoding matrix index (PMI), a second PMI, a first-type channel quality indicator (CQI) and a second-type CQI, wherein the first-type CQI and the second-type CQI are generated based on precoding information determined by a combination of the first PMI and second PMI,
   wherein the first-type CQI is calculated based on the number N of layers in which the downlink signal is received at the UE and on an assumption that other M-N layers do not interfere with the downlink signal received at the UE, where M indicates the number of transmission layers of the base station, wherein the second-type CQI is calculated based on an assumed number K of layers in which the downlink signal is transmitted from the base station (K>N) and on an assumption that the other M-N layers interfere with the downlink signal received at the UE, and wherein the second-type CQI in the channel state information is transmitted in bits fewer than the first-type CQI.

8. A user equipment (UE) for transmitting channel state information regarding a downlink transmission on uplink in a wireless communication system, comprising:

a reception module for receiving a downlink signal from a base station;

a transmission module for transmitting an uplink signal to the base station; and a processor for controlling the UE including the reception module and the transmission module, wherein the processor is configured to receive a downlink signal through a downlink channel through the reception module, generate a rank indicator (RI), a first precoding matrix index (PMI), and a second PMI for the downlink channel, generate a first-type channel quality indicator (CQI) and a second-type CQI based on precoding information determined by a combination of the first PMI and second PMI, and transmit channel state information comprising the RI, the first PMI, the second PMI, the first-type CQI and the second-type CQI through an uplink channel through the transmission module, wherein the first-type CQI is calculated based on the number N of layers in which the downlink signal is received at the UE and on an assumption that other M-N layers do not interfere with the downlink signal received at the UE, where M indicates the number of transmission layers of the base station, wherein the second-type CQI is calculated based on an assumed number K of layers in which the downlink signal is transmitted from the base station (K>N) and on an assumption that the other M-N layers interfere with the downlink signal received at the UE, and wherein the second-type CQI in the channel state information is transmitted in bits fewer than the first-type CQI.

9. A base station for receiving channel state information regarding a downlink transmission on uplink in a wireless communication system, comprising:

a transmission module for transmitting a downlink signal to a user equipment (UE);

a reception module for receiving an uplink signal from the UE; and a processor for controlling the base station including the transmission module and the reception module, wherein the processor is configured to transmit a downlink signal through a downlink channel through the transmission module, and receive through an uplink channel, channel state information comprising a rank indicator (RI), a first precoding matrix index (PMI), a second PMI, a first-type channel quality indicator (CQI) and a second-type CQI, wherein the first-type CQI and the second-type CQI are generated based on precoding information determined by a combination of the first PMI and second PMI through the reception module, wherein the first-type CQI is calculated based on the number N of layers in which the downlink signal is received at the UE and on an assumption that other M-N layers do not interfere with the downlink signal received at the UE, where M indicates the number of transmission layers of the base station, wherein the second-type CQI is calculated based on an assumed number K of layers in which the downlink signal is transmitted from the base station (K>N) and on an assumption that other M-N layers interfere with the downlink signal received at the UE, and wherein the second-type CQI in the channel state information is transmitted in bits fewer than the first-type CQI.

* * * * *